US008112453B2

(12) United States Patent
Falkenberg

(10) Patent No.: US 8,112,453 B2
(45) Date of Patent: Feb. 7, 2012

(54) SYSTEMS AND METHODS FOR RETRIEVING DATA

(75) Inventor: David J. Falkenberg, Glenville, NY (US)

(73) Assignee: Cybervore, Inc., Highlands, NJ (US)

( * ) Notice: Subject to any disclaimer, the term of this patent is extended or adjusted under 35 U.S.C. 154(b) by 21 days.

(21) Appl. No.: 12/322,534

(22) Filed: Feb. 3, 2009

(65) Prior Publication Data

US 2009/0182715 A1 Jul. 16, 2009

Related U.S. Application Data

(63) Continuation of application No. 11/473,542, filed on Jun. 22, 2006, now abandoned.

(60) Provisional application No. 60/692,987, filed on Jun. 22, 2005.

(51) Int. Cl.
*G06F 17/30* (2006.01)

(52) U.S. Cl. .................. 707/803; 707/769; 707/788

(58) Field of Classification Search .................. 707/769, 707/783, 803, E17.014, E17.044, 999.003, 707/99.101, 999.203
See application file for complete search history.

(56) References Cited

U.S. PATENT DOCUMENTS

| 6,738,760 | B1 | 5/2004 | Krachman |
| 6,839,707 | B2 * | 1/2005 | Lee et al. ......................... 1/1 |
| 2004/0024775 | A1 * | 2/2004 | Kemp ......................... 707/102 |
| 2004/0243556 | A1 * | 12/2004 | Ferrucci et al. .................. 707/3 |
| 2005/0216489 | A1 * | 9/2005 | Young et al. .................. 707/100 |

OTHER PUBLICATIONS

International Search Report for PCT/US2006/24496 dated Jul. 13, 2007.

* cited by examiner

*Primary Examiner* — Shahid Alam
*Assistant Examiner* — Andalib F Lodhi
(74) *Attorney, Agent, or Firm* — Wilmer Cutler Pickering Hale and Dorr LLP

(57) ABSTRACT

A system and method for obtaining information responsive to a legal discovery request directed at an enterprise having a plurality of databases that potentially include information responsive to the legal discovery request, including structured databases and at least one unstructured database. A plurality of taxonomies are provided, each of which describes a structure of one of the structured databases. An ontology is provided that describes data relationships between the databases. A native application is identified, which is configured to access at least one but not all of the databases associated with the enterprise. The native application is modified to include search functionality for accessing all of the databases associated with the enterprise. A request is received from the user, via the modified native application, to search the plurality of databases associated with the enterprise for information responsive to the legal discovery request. Information included in the request, the ontology and the taxonomies are then used to search the plurality of databases associated with the enterprise. A list of search results responsive to the search request is presented with the modified native application. In response to a user selection of a search result from the list, an application required to view the selected search result is automatically launched if the modified native application lacks functionality required to display the selected search result.

3 Claims, 19 Drawing Sheets

| Title | Author | Date | Size | Type | Folder |
|---|---|---|---|---|---|
| ENG-CPTR[OUTERBAY-000001]V01.00doc ...become an information provider to the LC_ARK Repository. Also, see Auto-Archiving Compliance[Note 1] Support for compliance with Sarbanes-Oxley HIPPA, SEC and other regulations, LC-ARK was designed to meet All Users\Documents\Affiniti\Marketing\Competitors | | 3/11/2004 6:49:1... | 1,267 KB | Microsoft Word... | All Users\Documents\Affiniti\Marketing\Competitors |
| ENG-MAN[LCARKSURVEY-000002]V0.... Pre-Installation Survey Guide Affiniti Manual LC-ARK LiveCache - Advanced Repository for Knowledge Pre-Installation Survey Guide Affiniti, Inc. 16 Portland Road Highlands, NJ 07732 Phone: (732) 747-9600 Fax (732) 747-9960 http://www.livecache.com/Copyright Notice Copyright... All Users\Documents\Affiniti\Projects\==Products==LC-DataManageLC-ARK | David J. Falkenberg | 1/20/2005 6:15:0... | 1,013 KB | Microsoft Word... | All Users\Documents\Affiniti\Projects\==Products==LC-D |
| ENG-MAN[LCARKSURVEY-000002]V0.... Pre-Installation Survey Guide Affiniti Manual LC-ARK LiveCache - Advanced Repository for Knowledge Pre-Installation Survey Guide Affiniti, Inc. 16 Portland Road Highlands, NJ 07732 Phone: (732) 747-9600 Fax (732) 747-9960 http://www.livecache.com/Copyright Notice Copyright... /Affiniti LC-ARK Demo Folders/Journal | David J. Falkenberg | 2/4/2005 4:30:26... | 1,023 KB | Microsoft Word... | /Affiniti LC-ARK Demo Folders/Journal |
| ENG-MAN[LCARKSURVEY-000002]V0.... Pre-Installation Survey Guide Affiniti Manual LC-ARK LiveCache - Advanced Repository for Knowledge Pre-Installation Survey Guide Affiniti, Inc. 16 Portland Road Highlands, NJ 07732 Phone: (732) 747-9600 Fax (732) 747-9960 http://www.livecache.com/Copyright Notice Copyright... All Users\Documents\Affiniti\Projects\==Products==LC-DataManageLC-ARK | David J. Falkenberg | 1/19/2005 1:41:0... | 951 KB | Microsoft Word... | All Users\Documents\Affiniti\Projects\==Products==LC-D |
| ENG-WEBSITE[PRODS-000001]V0.... ...Archive near your Advanced Repository for Knowledge A Dynamic Digital Repository to meet Government retention regulations and compliance requirements, including Sarbanes-Oxley HIPPA, and USA Patriot Act all LC products are Autonomous, Policy-Driven, Secure, and Manageable High Availability Architecture... All Users\Documents\Affiniti\Marketing\Web Site\Update =1 | Fred Callis | 1/22/2004 10:43:... | 69 KB | Microsoft Word... | All Users\Documents\Affiniti\Marketing\Web Site\Update |
| ENG-WHTPPR[LCARKSURVEY-000001]V0... ...Digital Repository Affiniti White Paper Meting the Challenges of Compliance Archiving LC-ARK, a Dynamic Digital Repositor Affiniti, Inc. 16...1 Purpose 1 1.2 Paper Summary 1 2 Compliance Challenges 2 2.1 Electronic Records 2 2.1.1... All Users\Documents\Affiniti\Projects\==Products== | David J. Falkenberg | 11/12/2003 4:22:... | 208 KB | Microsoft Word... | All Users\Documents\Affiniti\Projects\==Products== |
| ENG-WHTPPR[LCARKSURVEY-000001]V0... ...Digital Repository Affiniti White Paper Meting the Challenges of Compliance Archiving LC-ARK, a Dynamic Digital Repositor Affiniti, Inc. 16...1 Purpose 1 1.2 Paper Summary 1 2 Compliance Challenges 2 2.1 Electronic Records 2 2.1.1... All Users\Documents\Affiniti\Projects\==Products== | David J. Falkenberg | 11/13/2003 6:42:... | 695 KB | Microsoft Word... | All Users\Documents\Affiniti\Projects\==Products== |
| ENG-WHTPPR[LCARKSURVEY-000001]V0... ...Digital Repository Affiniti White Paper Meting the Challenges of Compliance Archiving LC-ARK, a Dynamic Digital Repositor Affiniti, Inc. 16...1 Purpose 1 1.2 Paper Summary 1 2 Compliance Challenges 2 2.1 Electronic Records 2 2.1.1... | David J. Falkenberg | 11/13/2003 8:03:... | 231 KB | Microsoft Word... | All Users\Documents\Affiniti\Projects\==Products== |

FIG. 6

| | | |
|---|---|---|
| CONTROL UUID | METADATA UUID | SOURCE DATA UNIQUE IDENTIFIER (UUID) |
| DATA DESCRIPTION INFORMATION | DIGITAL RIGHTS MANAGEMENT CONTROL INFORMATION | SOURCE DATA HASH VALUE |
| METATAG REPOSITORY LINK | METADATA SEARCH INDEX DATA | SOURCE DATA VERSION |
| VERSION LIST | DATA LIFECYCLE MANAGEMENT CONTROL INFORMATION | SOURCE DATA |
| OWNER ID | TIMESTAMP | |
| GLOBAL DIGITAL RIGHTS MANAGEMENT | METADATA VERSION | |
| GLOBAL LIFECYCLE MANAGEMENT INFORMATION | SOURCE DATA UUID | |
| METADATA CRC | SOURCE DATA LOCATION(S) | |

FIG. 15

| CONTROL UUID | METADATA UUID | SOURCE DATA UNIQUE IDENTIFIER (UUID) |
|---|---|---|
| DATA DESCRIPTION INFORMATION | DIGITAL RIGHTS MANAGEMENT CONTROL INFORMATION | SOURCE DATA HASH VALUE |
| METATAG REPOSITORY LINK | METADATA SEARCH INDEX DATA | SOURCE DATA VERSION |
| VERSION LIST | DATA LIFECYCLE MANAGEMENT CONTROL INFORMATION | REPLICATE ID |
| OWNER ID | TIMESTAMP | FRAGMENT ID |
| GLOBAL DIGITAL RIGHTS MANAGEMENT | METADATA VERSION | SOURCE DATA |
| GLOBAL LIFECYCLE MANAGEMENT INFORMATION | SOURCE DATA UUID | |
| METADATA CRC | SOURCE DATA LOCATION(S) | |

FIG. 17

SYSTEMS AND METHODS FOR RETRIEVING DATA

CROSS REFERENCE TO RELATED APPLICATIONS

The present application is a continuation of and claims priority under 35 U.S.C. §120 to U.S. patent application Ser. No. 11/473,542, filed on Jun. 22, 2006, entitled "Systems and methods for retrieving data," now abandoned, the contents of which are incorporated herein in their entirety by reference, which claims priority under 35 U.S.C. §119(3) to U.S. Provisional Application No. 60/692,987 filed Jun. 22, 2005 entitled "ARK System, Including Features and Functions Thereof," incorporated herein by reference in its entirety.

BACKGROUND

Today's enterprises that must swiftly and decisively react to demands for data due to regulations, legal entanglements, or for matters requiring precise, select business intelligence data. Among other things, today's enterprises often require strategic targeted information deployment that enables precision situational awareness during evolving tactical events requiring rapid and decisive action. When the need for such information arises, the information needs to be identified and provided to the locations and persons who require it without a fog of extraneous information.

The distinction between the three terms—data, information and knowledge is relevant to establish a common understanding of terms and concepts used in knowledge control. First, data represents facts, parameters or statistics that can be analyzed to produce information. Information is data related to a particular context that creates meaning. In other words, data represents facts and becomes information when embedded in a context of relevance to a recipient. In contrast to data that can be characterized as a property of things, knowledge is a property of agents (people or computer systems) predisposing them to act in particular way in circumstances defined by the context.

Knowledge Management (KM) is about the protection, development and exploitation of knowledge assets. KM encompasses theories, models, processes and tools that support the efficient and effective evaluation, acquisition, dissemination, development and exploitation of knowledge resources in organizational processes and decision making.

Knowledge engineering is the use of information assets regarding situations, users, products and technologies that an organization owns (or needs to develop as part of its strategic plan) and then uses to implement organizational processes efficiently and effectively.

Knowledge Engineering Systems and Tools provide the means of combining individuals' knowledge in the pursuit of personal and organizational objectives. In the simplest form, knowledge engineering supports person-to-person and group-to-group communications resulting in the development of new knowledge via integration. These more advanced computer collaboration and data sharing methodologies can create a level and quality of exchange not normally achievable within the conventional data-sharing environment.

Enterprises are caught in the middle of explosions with respect to government regulations, litigation, and data to be managed, all of which are occurring simultaneously. These intertwined issues require a level of knowledge, information and data management not formally required for day-to-day business at a company. In order to meet these challenges, a company must utilize resources at their highest efficiency and select tools to readily manage, engineer and integrate the data of the enterprise into a knowledge solution. The present invention addresses shortcomings in existing knowledge management solutions, and provides today's companies with tools useful for overcoming current knowledge management challenges.

SUMMARY OF THE INVENTION

The present invention is directed a system and method for obtaining information responsive to a legal discovery request directed at an enterprise. The legal discovery request corresponds to a document subpoena directed to the enterprise or a request for production of documents served on the enterprise in litigation. A plurality of databases is associated with the enterprise. The databases potentially include information responsive to the legal discovery request, and include a plurality of structured databases and at least one unstructured database. A plurality of taxonomies are provided, each of which describes a structure of one of the structured databases. An ontology is provided, based at least in part on the taxonomies, that describes data relationships between the plurality of databases associated with the enterprise. A native application is identified, which is configured to access at least one but not all of the plurality of databases associated with the enterprise. The native application is modified to include search functionality for accessing all of the plurality of databases associated with the enterprise. A request is received from the user, via the modified native application, to search the plurality of databases associated with the enterprise for information responsive to the legal discovery request. Information included in the request, the ontology and the taxonomies are then used to search the plurality of databases associated with the enterprise. A list of search results responsive to the search request is presented to the user with the modified native application. In response to a user selection of a search result from the list, an application required to view the selected search result is automatically launched if the modified native application lacks functionality required to display the selected search result.

In accordance with a further aspect, the present invention may be implemented in the context of a software application that is currently available in a current version and which was previously available in an old version, where the current version of the software stores data in a current data storage format and the old version of the software previously stored in an old data storage format which is different from the current data storage format. A data metamorphosis system and method in accordance with the present invention is used in this context to support usage of data stored in the old data storage format with the current version of the software. In accordance with the invention, an XML (eXtended Markup Language) definition is provided for each of a plurality of object classes used to store data in the old data storage format and the new data storage format, and data format rules are provided for each XML definition. When the current version of the software recalls data in the old data storage format, at least some of the XML definitions and format rules are used to dynamically convert the data in the old storage format to the current data storage format, thereby allowing usage of the data in the old storage format by the current version of the software.

In accordance with a still further aspect, the present invention is directed to a system and method of providing a data collaboration environment that changes dynamically based on the occurrence of events external to the data collaboration environment. The collaboration environment is defined to include roles, activities and external event specifications. Each role defines data access privileges granted to a user during a session, each activity defines with whom the user can share data, and each external event specification defines an event external to the collaboration environment which must occur before an activity is permitted for a defined role during a session. Data sharing privileges granted to a user change dynamically in response to the occurrence of an external event identified in one of the defined external event specifications.

In accordance with yet a further aspect, the present invention is directed to a system and method for collecting and retrieving data for an enterprise with a plurality of databases including a plurality of structured databases and at least one unstructured database. A plurality of taxonomies is provided, each of which describes a structure of one of the structured databases. An ontology is provided, based at least in part on the taxonomies, that describes data relationships between the plurality of databases of the enterprise. A software agent is associated with each of the plurality of databases of the enterprise. Each software agent uses information included in a search request, the ontology and the taxonomies to search an associated database and generate search results. Each software agent duplicates and archives data retrieved from the associated database based on the search results, and wraps the retrieved data with a standardized object format that facilitates data transformation and secure access of the retrieved data at a field level. Each software agent also logs events that occur with respect to an application that corresponds to the database associated with the software agent. The events logged by the software agent include, for example, server status, server operations performed, and network status.

In accordance with another aspect, the present invention is directed to a network having a plurality of nodes, where nodes enter and exit the network in a manner that is unpredictable. Data availability is improved in the network by fragmenting data across the network nodes in order to increase a likelihood that the data will be available irrespective of a combination of nodes that are connected to the network at any given time. Each fragment of data includes a header with control information that specifies how the fragment connects with other fragments stored in the network.

BRIEF DESCRIPTION OF THE DRAWINGS

FIG. 6 is a still further exemplary screen shot illustrating a native application which has been modified to include the Search Interface for accessing the search functionality of the present invention.

FIG. 15 is a block diagram illustrating the object transmission format used by the data collector agent for transmitting information.

FIG. 17 is a block diagram illustrating a fragmented object store header format, in accordance with the present invention.

DETAILED DESCRIPTION OF THE PREFERRED EMBODIMENTS

A. Overview

Figure 1:
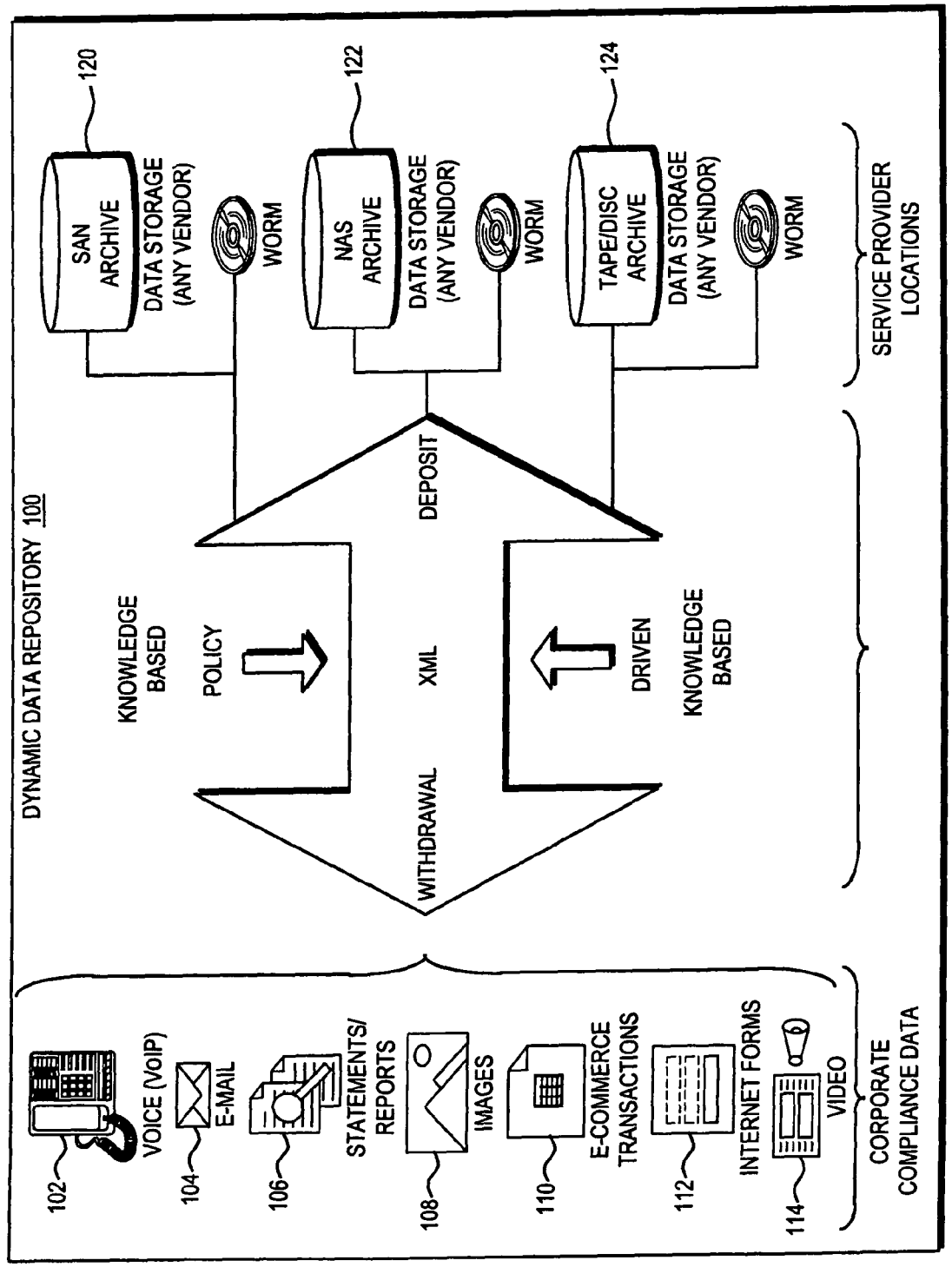
FIG. 1 is a flow diagram depicting knowledge flow or data flow through the repository of the present invention.

In one embodiment, the present invention is implemented as an object-oriented, agent-based scalable digital repository that creates a storage virtualization layer over any combination of storage devices, databases or other knowledge sources. The invention combines aspects of relational, object-oriented and XML databases to create a content integrating repository. The invention uses data mining methods and graphical interface tools, and interfaces with most disparate enterprise data sources requiring only point-and-click methods during installation. Other 'content integrating' knowledge managers require substantial entry of SQL code and XML in order to accomplish the connection to the enterprises' disparate data sources.

Certain embodiments of the present invention also include the capability to dynamically metamorphose data between storage locations within the repository or upon retrieval from the repository to an application. Data is stored in an open format and searchable metadata indices are automatically generated for all data inserted into the repository. The indices can be stored separately from the data and can be interfaced to archive librarian utilities to manage and control both on-line and off-line data.

Existing data may be made accessible to the present invention by describing the format and structure of the data via XML oriented methods and then having the invention scan and build metadata indices. New data may be inserted into the repository via API calls or using a utility program that pulls data directly from the data source without altering existing programs.

Policy Templates control the metadata index content and determine where a particular data class will be stored within the repository. Support for Information Lifecycle Management and Digital Rights Management are provided in certain embodiments.

The software of the present invention preferably includes the following functionality:

1. The software supports interfaces to enterprise databases and applications, plus web service middleware such as Web Sphere.

2. The software binds tightly with applications. This ability is important to compliance-oriented solutions or to solutions where creations of an audit trail and secure storage on data is required. This is performed via a module that binds tightly to the data-source application (such as an Exchange Mail Server) and records all activity of the server as well all executed data transactions.

3. The software preferably includes an auto-archiving ability. Through policy definition, data can be automatically moved off-line or to other storage locations. As time passes some data no longer is actively used in the enterprise. This data is archived or placed on storage that no longer allows modification of the data. This media can be, but is not limited to, certain types of disk drives or tape storage. The software allows the data to be moved to off-line storage while maintaining metadata indices online with the location of all the data. Off-line refers to storage media that requires human or mechanical intervention in order to access the data via means of a computer (tape stored on a shelf must be mounted in a tape drive by an operator). This maintains database performance and levels and reduces resource utilization as information accumulates. Compliance data may be moved offline, unless used to support the findings of an audit, after, e.g., a pre-set period of time such as three years, but be able to be located on-line for a longer period, e.g., seven years (per Sarbanes-Oxley and SEC Rule 17). The software allows the data to be moved to off-line storage while maintaining the metadata indices online with the location of all the data. This is performed without explicit user action via policy. The software also supports the 'marking' of audit/case support information causing it to remain online per compliance requirements so that it can be easily is retrieved as supporting information.

4. The software requires no changes to existing data sources or applications for their integration into the repository used by the present invention.

5. The software preferably meets the stringent requirements of the rules and regulations recently established for compliance with Sarbanes-Oxley, HIPPA, SEC and other regulators. In one embodiment, the software offers an auditable, secure chain of evidence from data generation at the data source to destruction of the data per policy. The data is always stored in the archive in the original data format. The software preferably supports various aspects of compliance support, including the ability to extend the on-line and destruction times of selected data items per regulations should they support audit findings. In order to accomplish these objectives, the software uses separate meta-data indices from the data per requirements, and provides a packaging function that will copy the metadata and source data to a specified destination (CD-ROM, DVD, Disk Drive, etc.) with (optionally) a search engine to aid the receiver of the knowledge in processing of the data.

6. The software supports Digital Rights Management (DRM) of the data deposited in its repository. Policies are used to control the application of where and how DRM is applied within the repository. The software also preferably supports use of the XML standards for Digital Rights Management including (i) DPRL—Digital Property Rights Language, (ii) XrML—Extensible Rights Markup Language, and (iii) XACML—Extensible Access Control Language.

7. The software supports packaged and custom applications, databases (Oracle, DB2, SQL Server, Informix, and Sybase), servers and storage classes (SAN/DAS. CAS. Tape), and is configurable for single companies, multiple divisions, multinational organizations, or ASPs supporting any combination of organizational types. The software includes policies and templates that may be configured to control each organizational unit's storage affinity and retention periods separately or in an aggregate form. The software also interfaces transparently with collaboration software such as Lotus Notes and Microsoft Exchange.

8. The software is based on a Highly Available Architecture (HAA) that assures data being deposited or withdrawn from the repository is delivered and correct. Automatic synchronization and healing of virtualized storage areas is automatically performed per policies and rules after a partitioned network is healed.

9. The software enables the transparent integration of data from diverse and disparate sources.

10. The software is based on a Hierarchical Index Architecture that can handle any data type and any number of entries. This is enabled by using a hierarchy in the index structure that allows a distributed method for the index. The index or metadata can be replicated like data in a database, and assigned affinity to geographical locations or logical locations. This allows an index to be generated near the data source and then 'distributed' for search operations via the network according to policy. The index can be merged into a central index or intelligently summed to allow the rapid locating of those distributed data sources which contain items of interest to be recalled.

11. The software supports policy definition for retention and has the ability to manage data from non-structured sources such as email and Instant Messaging also via policy. Any source of data (document scanners, fiche readers, 5ESS switch, etc.) can become an information provider to the repository of the present invention.

12. The software provides a unified view of repository data growth for the monitoring and control of the all storage areas and types that make up the repository. Views by location, data classes, storage type, etc. are possible. An added feature is to create knowledge relationships based upon chained events. This allows the creation of alerts or other defined actions that require correlation of a complex series of events. For example, a keyword match of selected words in an email, followed by a phone call to a particular number, then ending with a stock trade could be a possible alert. The software provides the ability for charge-back information to be supplied to budgetary programs and applications.

13. The software has a language semantic engine that improves the 'fuzzy' search results beyond the stemming methods used in other search processing engines. The software utilizes an analytic engine that employs: (i) prefix/suffix recognition (which masks certain semantic components), (ii) text segmentation (which provides improved recall for non-white space languages), (iii) component segmentation (which breaks words into linguistic constituents, e.g., paragraph, sentence, word, compound word, URLs, etc.), (iv) normalization (for handling inflection differences (mouse/mice), (v) variant spelling matching (e.g., Color=Colour), and (vi) lemmatization which matches conceptually similar words ('demonstrate'='demonstration' but does not match 'demon').

14. The software automatically builds searchable metadata indices based upon policy templates for particular data sources or classes as data is inserted. It allows for the creation of multiple indices to group similar data for rapid searches and retrieval. The software allows for the scanning of existing data for inclusion into the metadata indices. The metadata is gathered from sources controlled via policy templates. Compliance specific features such as keyword controls, attachment scanning plus indexing, and linking of receipts, etc., for email and IM are provided along with other features.

15. The software has the ability to dynamically transform data upon retrieval. Using the taxonomy and ontology information contained in a knowledge encyclopedia, the software combines this information with specific transformation rules to convert the data as necessary to meet the requirements for the information to be utilized by the retrieving application.

16. The software supports a multiple language ability for serving international enterprises that exchange data freely across borders. The search engine supports queries with intelligence to improve the relevancy of the search results across different languages.

17. The software uses an object-oriented digital repository. This allows integration between the application logic and the archived data to be the most transparent possible, this is known as transparent persistence. The ability to keep the persistence and application logic in the same object-oriented paradigm simplifies modeling, design tool requirements, and visualization of the system architecture and design. The persisting may apply not only to data but also the entire object, including its implemented behavior. This supports calling the persisted object's methods on a remote database server, thereby providing advantages in scalability and distribution. In a relational database, by contrast, stored procedures or COM objects would need to be implemented to accomplish this result, forcing some duplication of coding efforts or a more awkward architecture. The present invention reduces development time by allowing developers to focus on object persistence, not the decomposition of objects to rows and parent/child relationships in one or more tables. In most cases, a developer simply saves an object to the repository.

18. The software utilizes a highly scalable architecture that provides the ability to handle the demands of enterprise applications and distributed native data access. The software uses optimization of queries and transparent dynamic caching methods to deliver users a non-disruptive, responsive approach to enterprise knowledge search and retrieval. The software scales by the simple addition of more agents to handle increased transactional loads. The agents utilize network traffic monitoring, node loading measures, and transaction counts creating a feedback loop that enables intelligent decision making about when, where and if additional agents are needed. The software can also generally throttle operations in order to maintain throughput on other critical applications operating in the network. The performance control mechanism is also capable of throttling only certain types of operations based upon type, user, group, data of day, node, network segment, etc.

19. The software is hardware/software platform neutral or agnostic. The software runs on mainframes to embedded platforms and supports operation on z/OS, z/VM, OS/400, AIX, Linux, Solaris, Windows and etc.

20. The software provides for support of policy or template-based control of data retention. It also uses policies to control data affinity or the ability to direct selected data types to particular storage types or physical locations. The policy allows for the replication of data among locations and storage types. For example, using the metamorphose ability with replication it is possible to replicate database tables with unlike structures by establishing policy rules on how to convert the data.

21. The software leverages the abilities and functionality of the databases and storage technology that it interfaces with during virtualization of data sources. The indexing and storage processes can be tasked to the database and storage technology that delivers the best performance for that data or information type.

22. The software uses available technologies to locate and retrieve knowledge from the repository. The software's unique architecture allows the user to leverage the data mining abilities, unique search abilities and other features of the database and applications it utilizes as data sources. The software includes features that allow the specification of external programs, routines, etc. for specific data search problems. For example, the software can be extended to annotate and process video streams real-time to create easily searchable video knowledge repositories. The default search methods implemented in the software use the latest ranking and fuzzy search technology to enable the user the greatest ease of use.

23. The software supports basic and advanced security modes of operation. From simple password based protection to advanced Digital Rights Management methods on individual data items fields. The software also uses compressed, encrypted communications (selectable by policy) for movement of data within the archive or between storage locations. This is also used to create a true chain of evidence for data relating to compliance. The 'chain of evidence' provides a secured log of all types of access attempted or performed on any information deposited within the repository.

24. The software supports XML open standards and eliminates the risk of application obsolescence. Data remains accessible even after the application is retired. In addition, the software will metamorphose data per a defined policy during retrieval to support the current version of an application or other data formatting requirements of a retrieval destination. The software is in compliance with ISO 14721 and DoD 5015.2 for Digital Archives.

25. The software provides transparency such that all data sources appear and act as one data source. The software can access archived data through existing application interfaces, online, and in real time. In addition, offline data requests are queued via librarian utilities or via operator interfaces and managed without user intervention. Off-line (long-term archived items) can be queued for retrieval and then presented to the requesting user once they have placed on-line either in the on-line archive or in a temporary cache per policy.

26. The software allows data items to be versioned in the repository. This keeps a complete audit trail of the data item thought all of its changes. Policies are used to determine the version number allowed, expiration dates, always keep the original and other options. Compliance data is preferably never modified, and CRC or MD5 signature methods are used on the data to ensure this does not happen. Encryption via other algorithms is also available.

B. System Architecture

Referring now to FIG. 1, a flow diagram is shown depicting knowledge flow or data flow through the repository of the present invention. Corporate compliance data from different sources within an enterprise is generated from a source application, device or database (e.g., VoIP application 102, e-mail application 104, statement/report application 106, image database 108, transaction database 110, internet forms database 112, or video database 114) and deposited to storage repository 100 using XML based data descriptions and policies. A list of different source data formats that may be generated by source applications and deposited into repository 100 are shown in Appendix A. The different data sources within the enterprise may include structured databases and unstructured databases.

Referring still to FIG. 1, storage areas 120, 122 and 124 are used for storing data in repository 100. NAS/SAN arrays, databases or any other device may be used for storage. Data that has been deposited into repository 100 may also be withdrawn. Unlike other digital repositories tasked for compliance issues, the software of the present invention is capable of returning the data to the source application, device or database. This allows users to access and work with data in repository 100 utilizing an interface on a native application (i.e., an interface on application/device/database 102, 104, 106, 108, 110, 112 or 114 such as, e.g., Lotus Notes or Microsoft Exchange in the case of e-mail application 104), thereby reducing or eliminating training for a new program.

Figure 2:
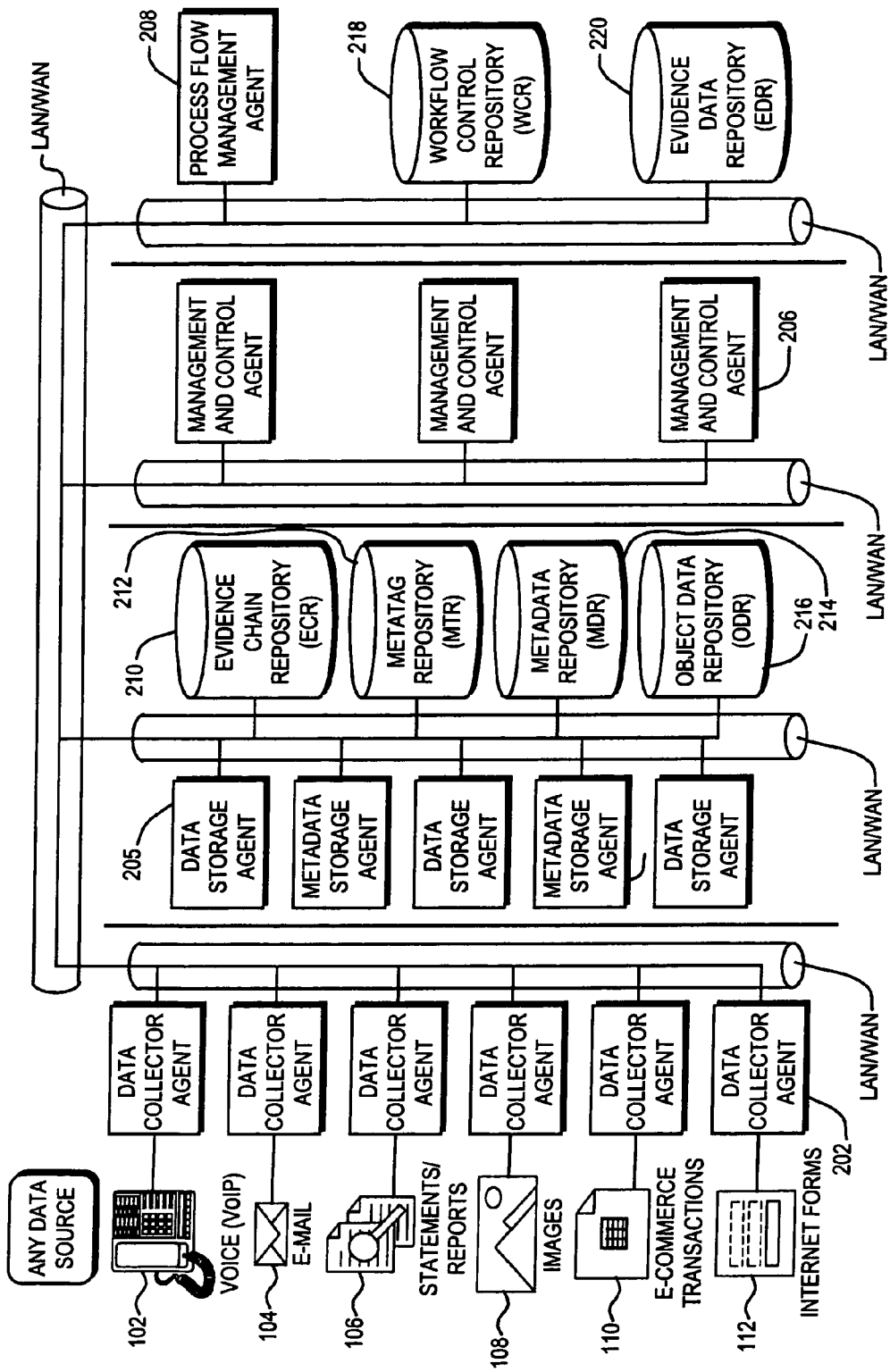
FIG. 2 is a block diagram showing program components and logical storage areas used for implementing the search technology of the present invention.

FIG. 2 is a block diagram showing the program components and logical storage areas used for implementing the search technology of the present invention. The architecture shown includes four program components (data collector agents 202, data storage agents 204, management and control agents 206, and process flow management agent 208) and utilizes six different logical storage areas (discussed below) to perform its functions. FIG. 2 shows the functional deployment in a network of the program and storage area components of the present invention. Multiple instances of each the components may exist in a network to provide scalability, reliability and accessibility to the data in repository 100. The six logical storage areas used by the architecture are:

1. An Evidence Chain Repository (ECR) 210, which holds an audit log of all activities for a given item deposited into repository 100. This log also includes the activities of the data source associated with a given item of data, such as when the server is taken down or purges are run, etc.

2. A MetaTag Repository (MTR) (Knowledge Encyclopedia) 212, which holds XML based descriptions of the various native formats of the data supplied to repository 100 by sources 102, 104, 106, 108, 110, 112. In one embodiment, MTR 212 also holds (i) security templates/policies, (ii) processing templates/policies, (iii) indexing rules/requirements, (iv) taxonomy and ontology of the enterprise data, (v) data metamorphosis rules, (vi) workflow processing triggers, (vii) data correlation rules, and (viii) storage area affinity and control policies.

3. A MetaData Repository (MDR) 214, which holds indexes to the data stored in repository 100 or registered with repository 100 for purposes of searching.

4. An Object Data Repository (ODR) 216, which holds stored data.

5. A Workflow Repository (WCR) 218, which holds workflow process rules for targeted data classes.

6. An Evidence Data Repository (EDR) 220, which holds data linked and kept separate during a workflow process for purposes of isolation or easy retrieval.

Figure 3A:
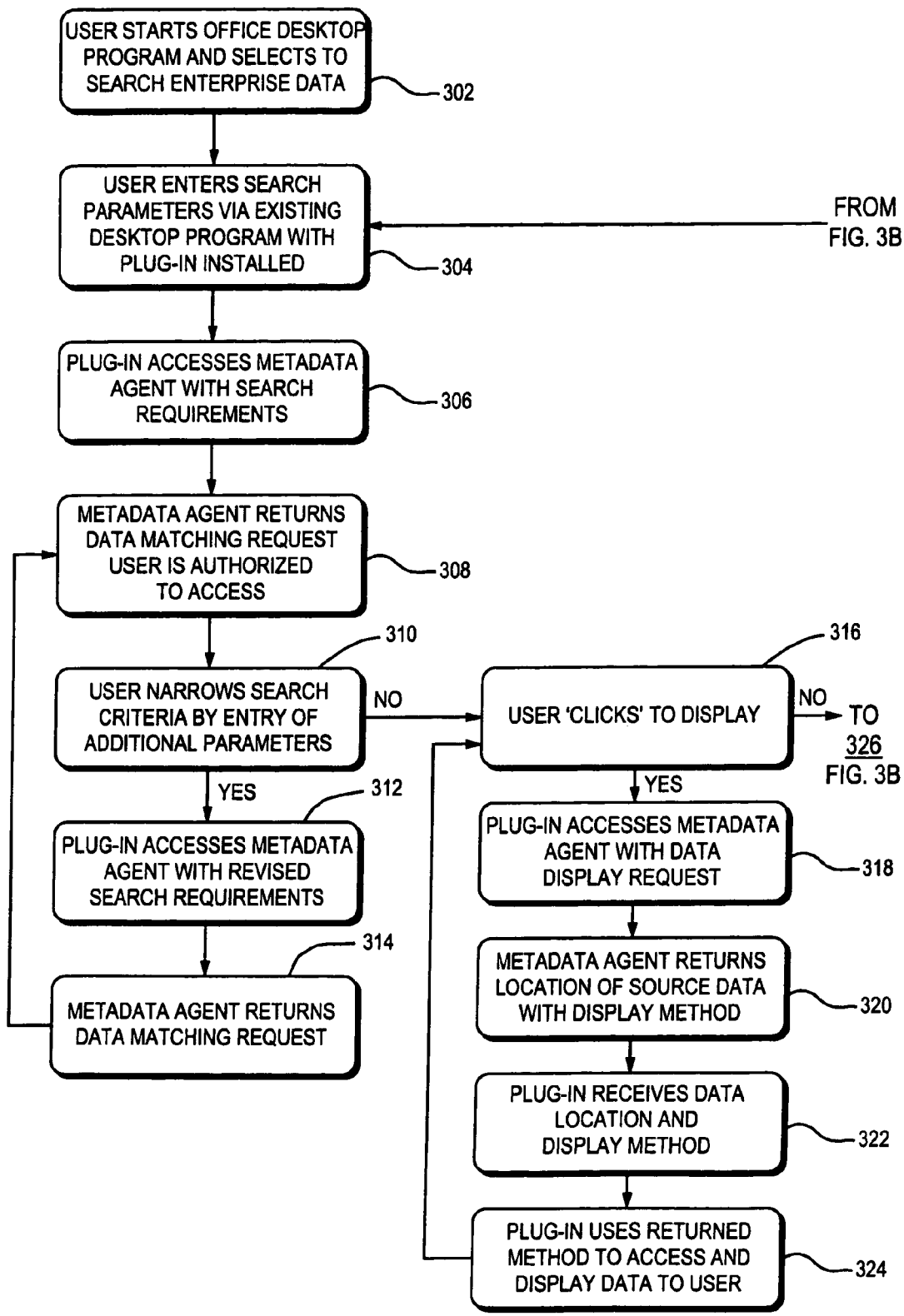
FIG. 3 is a flow diagram illustrating steps performed by the search technology of the present invention.
Figure 3B:
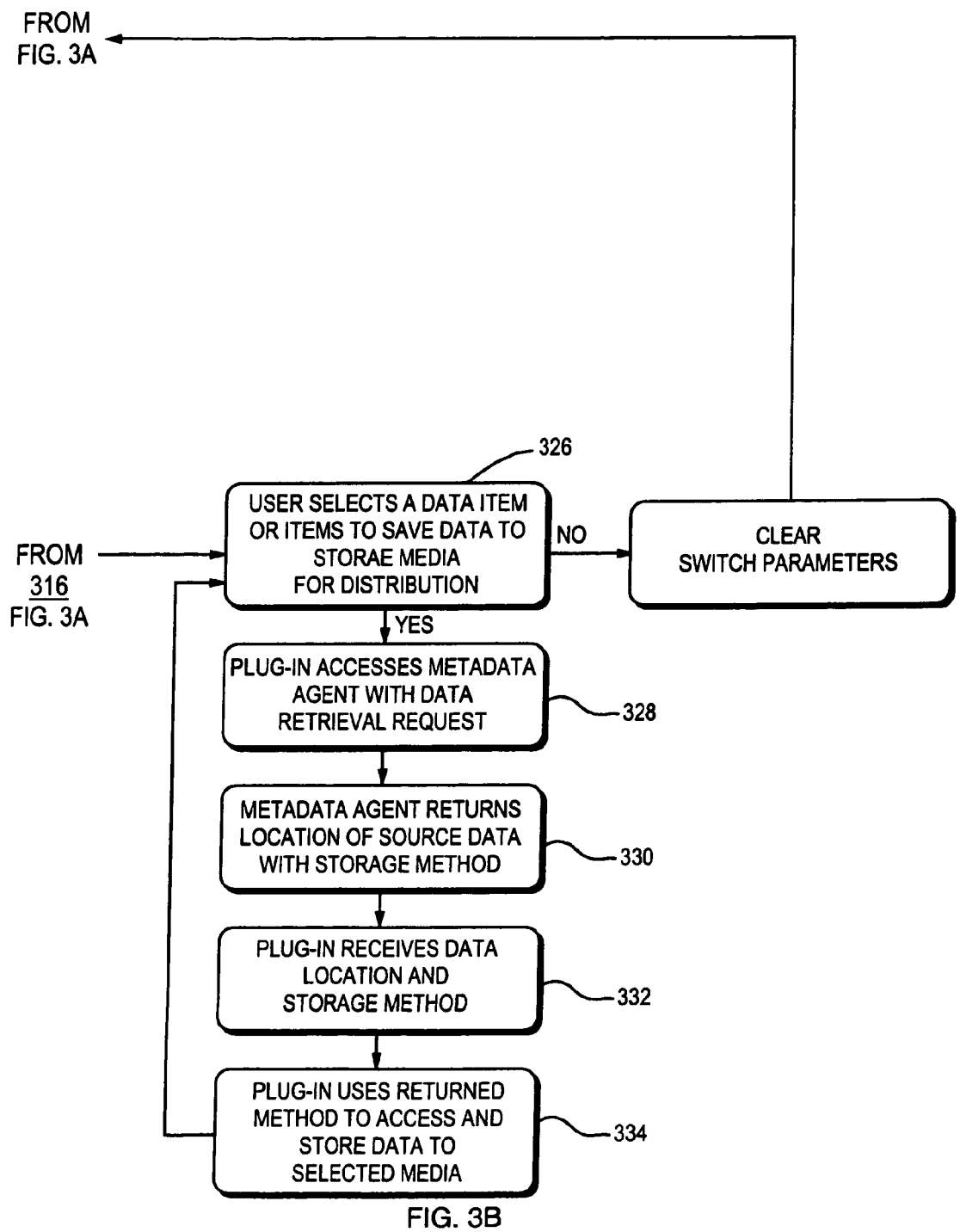
Figure 4:
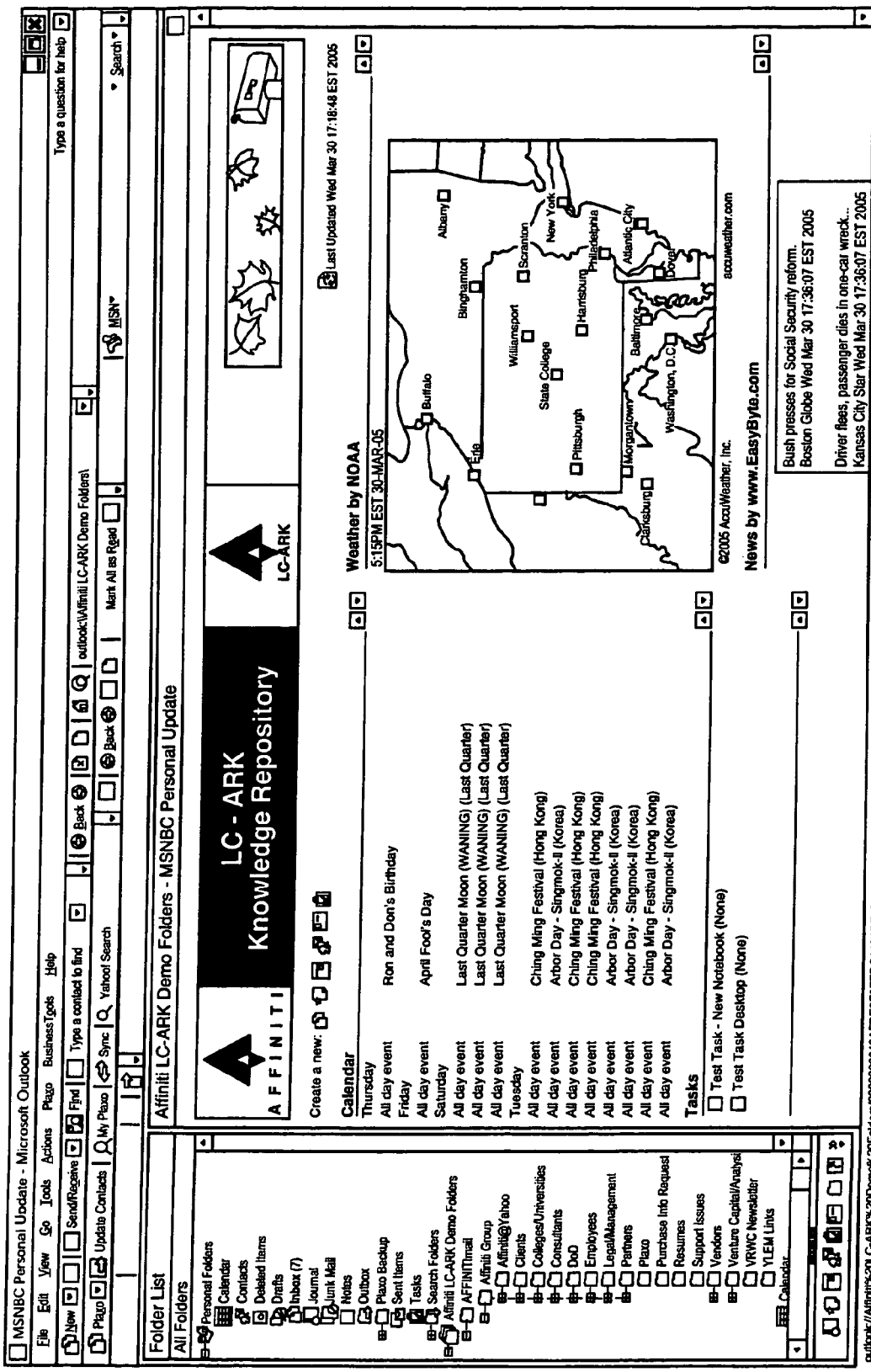
FIG. 4 is an exemplary screen shot illustrating a native application which has been modified to include a Search Interface for accessing the search functionality of the present invention.
Figure 5:
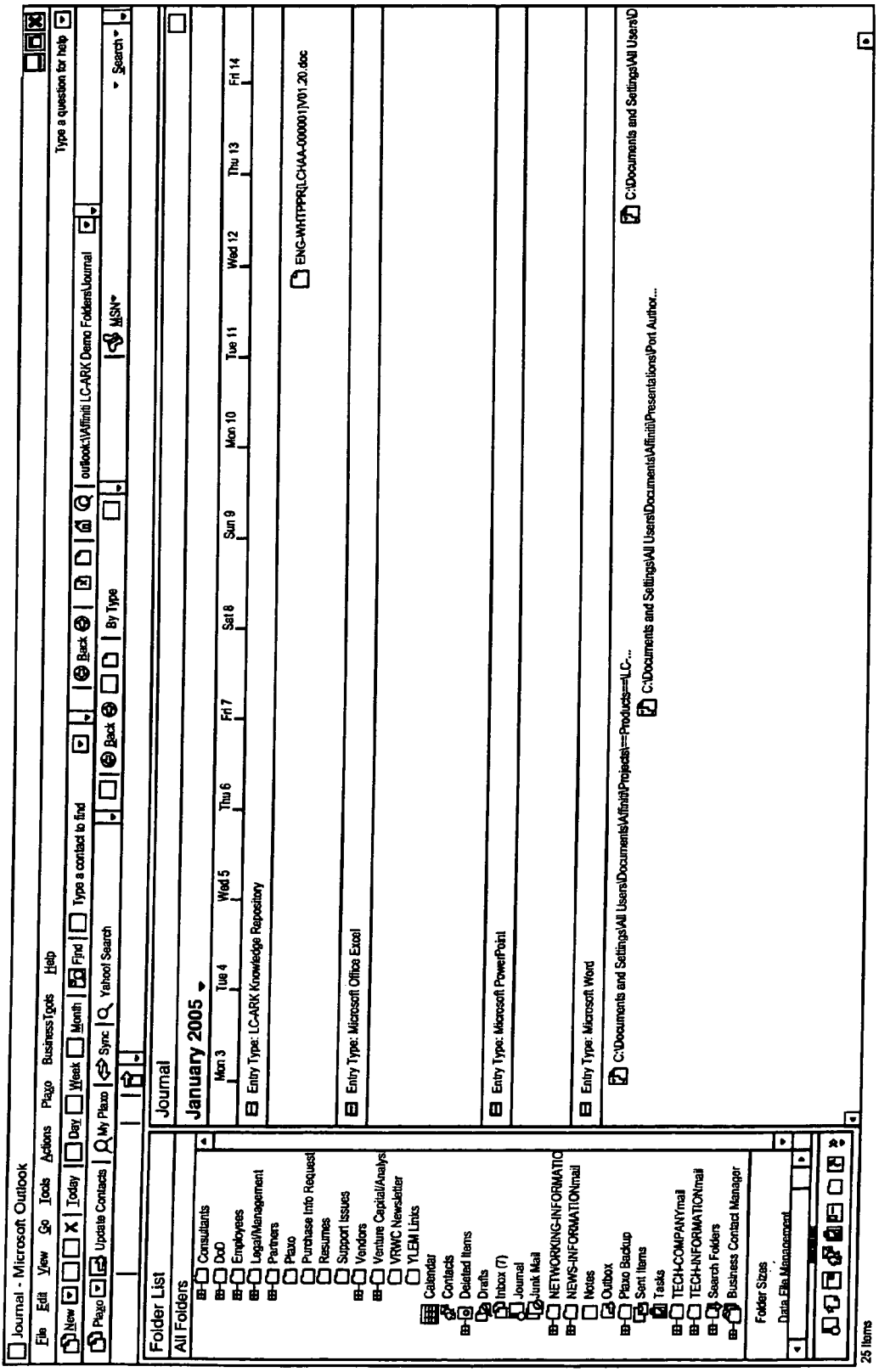
FIG. 5 is a further exemplary screen shot illustrating a native application which has been modified to include the Search Interface for accessing the search functionality of the present invention.
Figure 7:
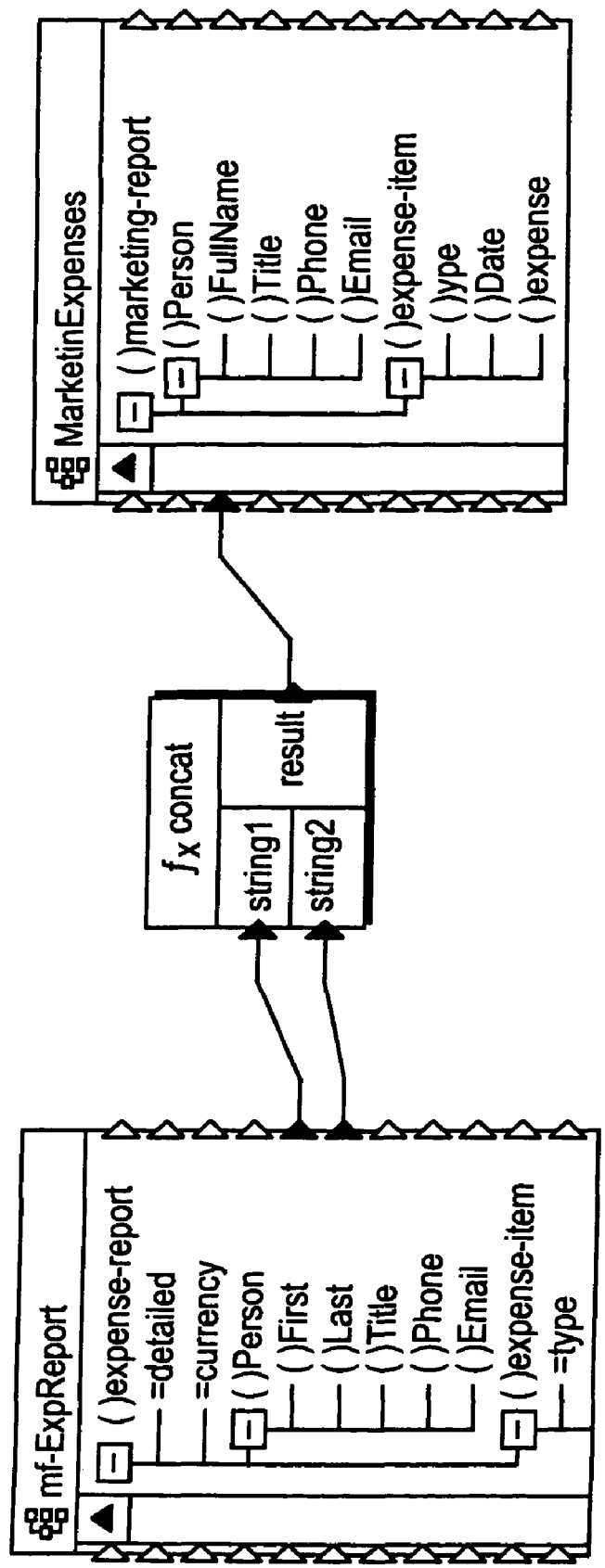
FIG. 7 is a graphical user interface for mapping data between a current version of a software application which stores data in a current data storage format and an old version of the software which previously stored the data in an old data storage format.
Figure 8:
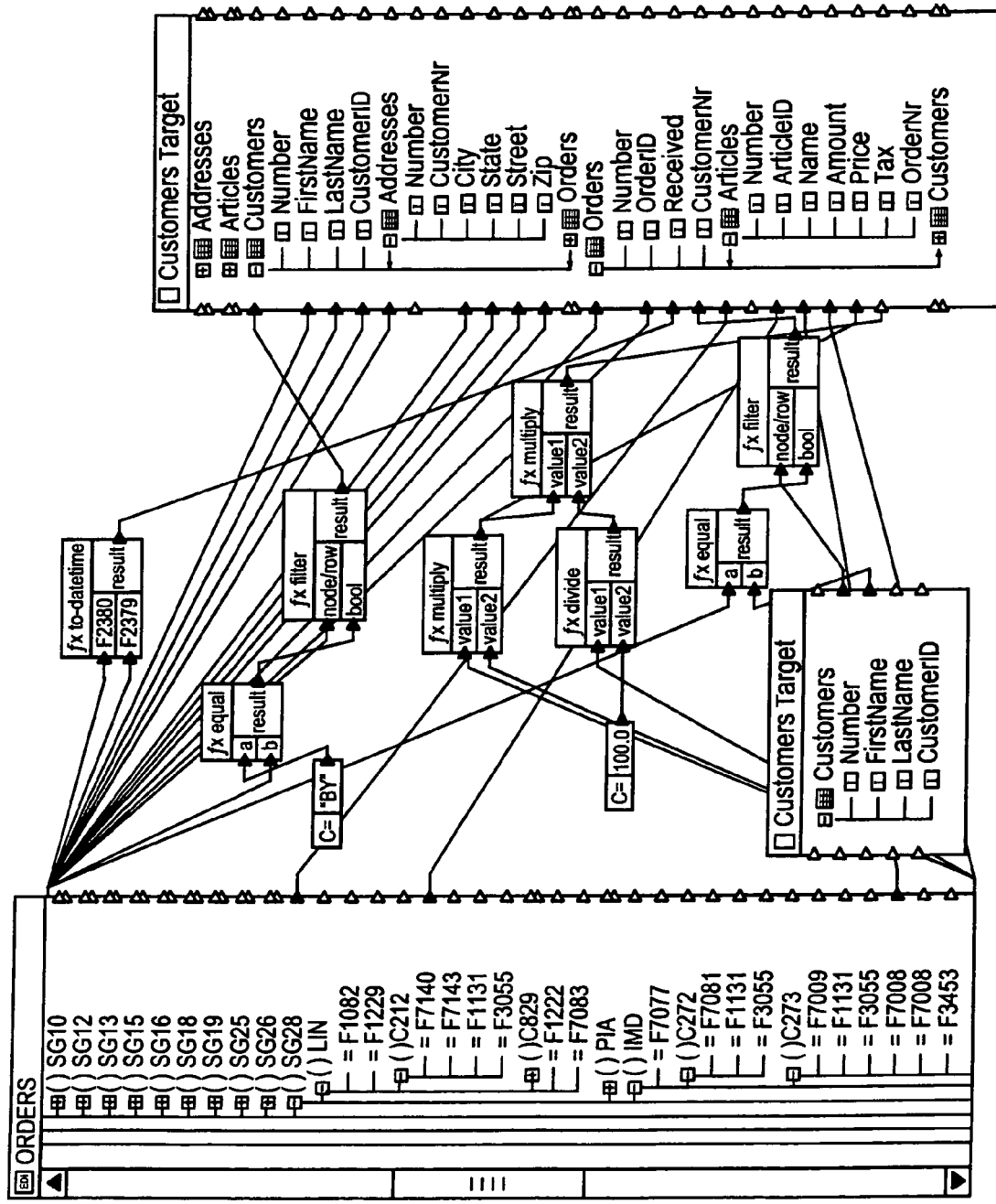
FIG. 8 is a further example of the graphical user interface for mapping data between a current version of a software application which stores data in a current data storage format and an old version of the software which previously stored the data in an old data storage format.
Figure 9:
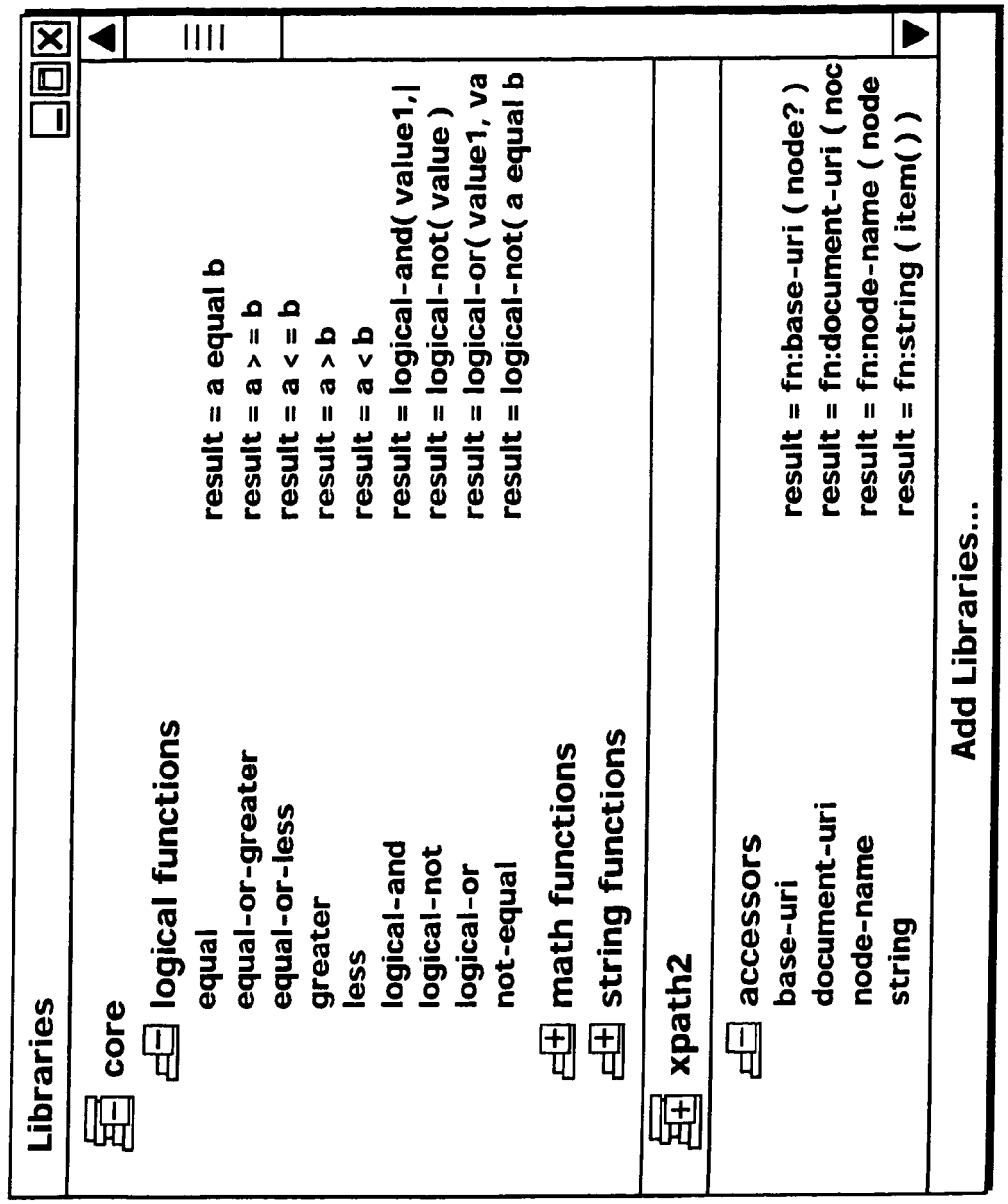
FIG. 9 is a graphical user interface depicting certain core functions that the user can select in order to map data between a current version of a software application which stores data in a current data storage format and an old version of the software which previously stored the data in an old data storage format.
Figure 10:
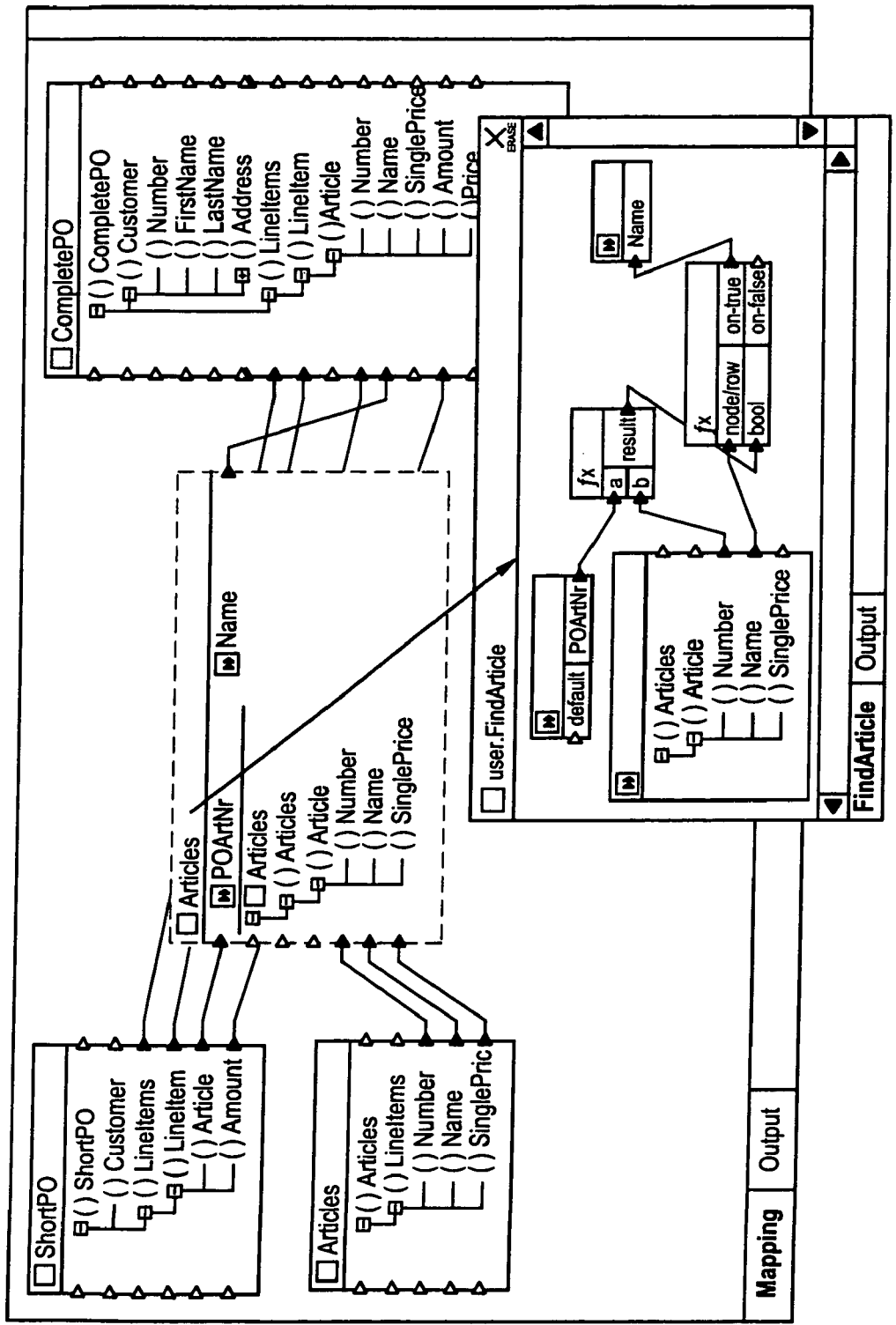
FIG. 10 is a graphical user interface depicting a user-defined function (created from the core functions of FIG. 9) developed by a user for mapping data between a current version of a software application which stores data in a current data storage format and an old version of the software which previously stored the data in an old data storage format.
Figure 11:
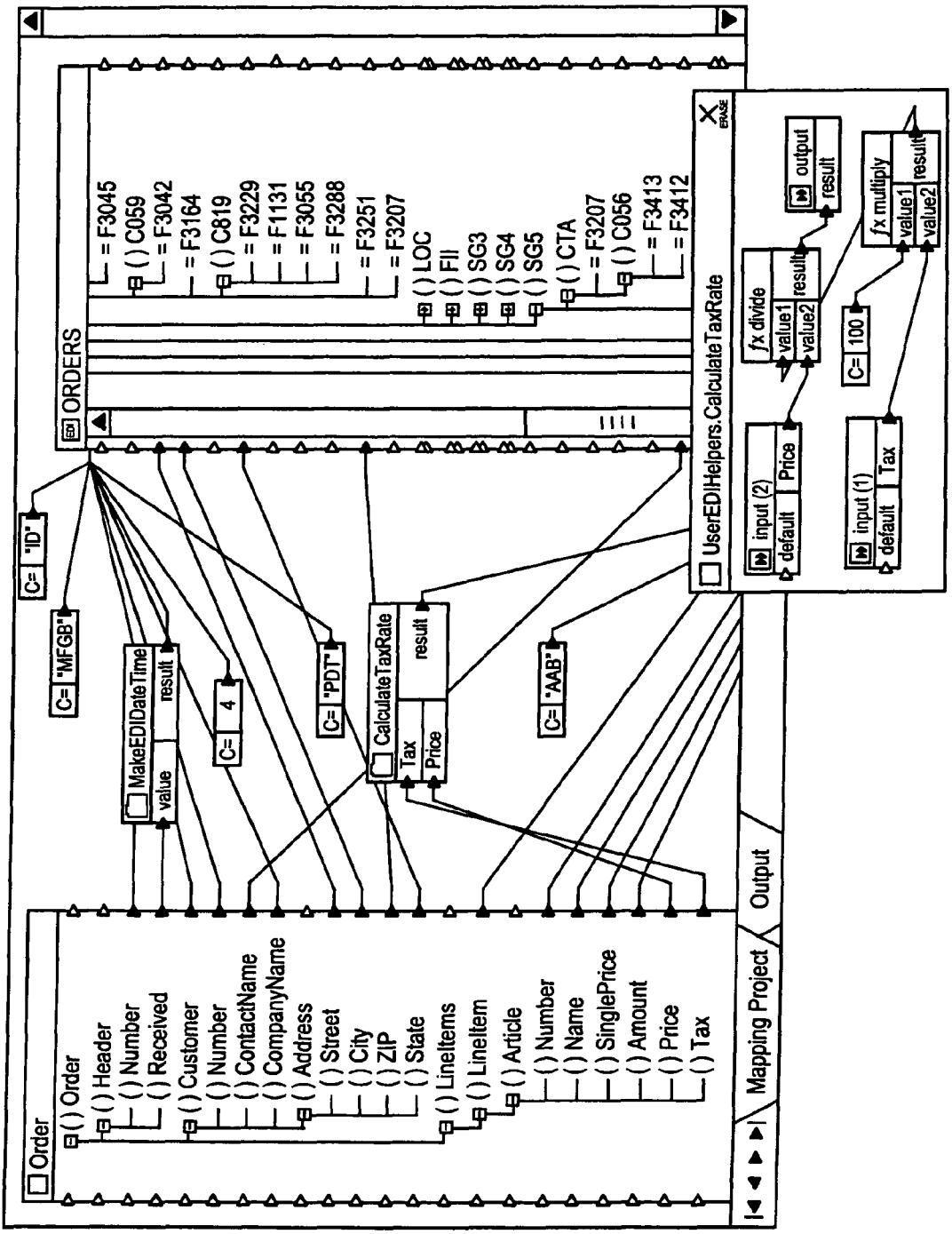
FIG. 11 is a graphical user interface depicting a visual function builder for mapping data between a current version of a software application which stores data in a current data storage format and an old version of the software which previously stored the data in an old data storage format.
Figure 12:
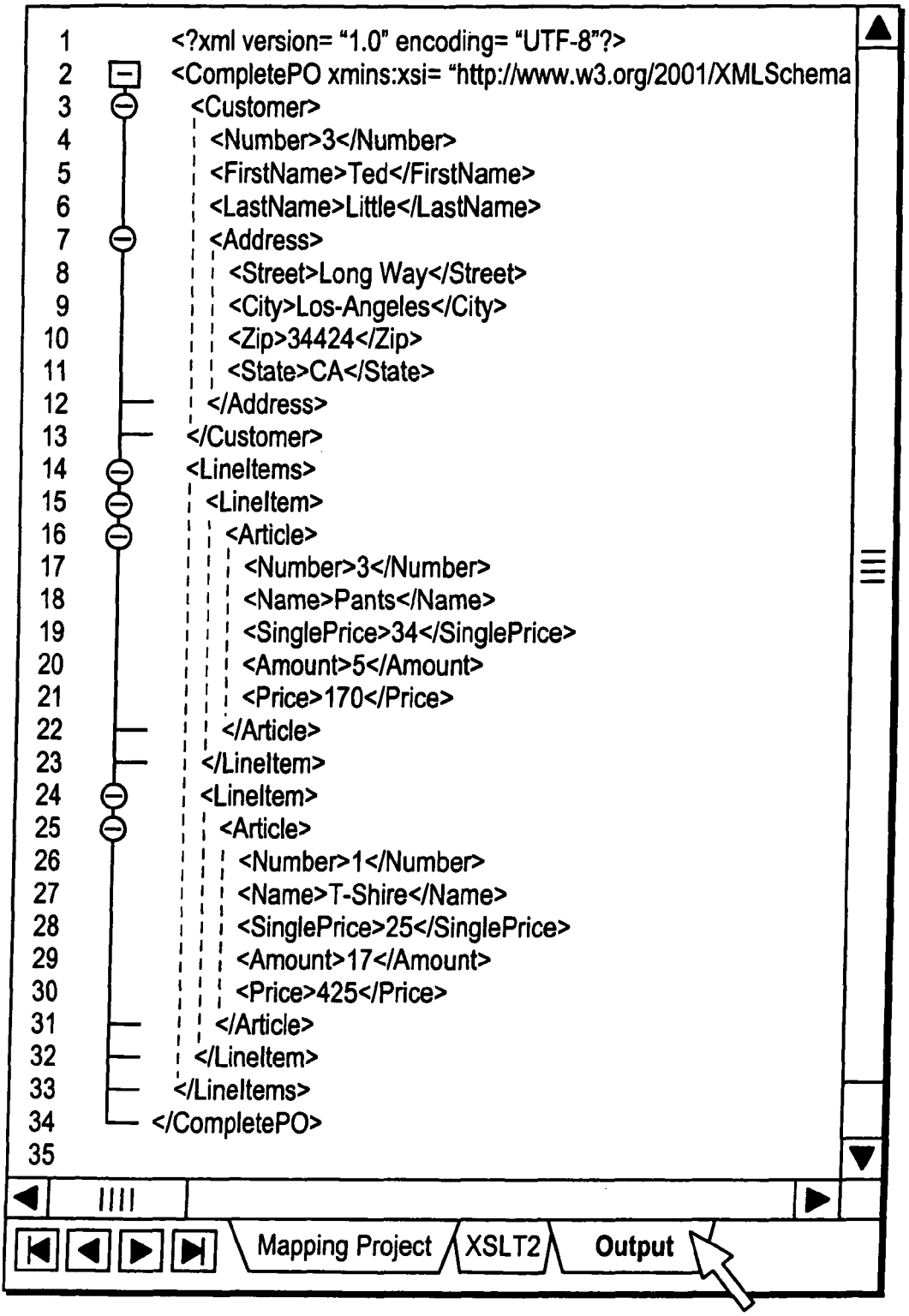
FIG. 12 depicts an XML Schema generated using the user-interface shown in FIGS. 7-11.

Referring now to FIG. 3, a flow diagram is shown illustrating various steps performed by the search technology of the present invention. In step 302, the search technology of the present invention is invoked through a native application associated with one of sources 102, 104, 106, 108, 110, 112, which has been modified to include a Search Interface for invoking the search functionality of the present invention in order to simultaneously access all of the plurality of data sources associated with the enterprise. Exemplary screen shots illustrating a native application (Microsoft Outlook in the example shown) which has been modified (e.g., using a plug-in) to include the Search Interface for accessing the search functionality of the present invention are shown in FIGS. 4-6.

In step 304, the user enters search parameters (for searching all of the plurality of data sources associated with the enterprise) into the Search Interface. In one embodiment, the search parameters represent search terms and a search strategy designed to elicit information responsive to a legal discovery request directed at an enterprise. In this embodiment, the legal discovery request corresponds to a document subpoena directed to the enterprise or a request for production of documents served on the enterprise in litigation. Next, in step 306, the search parameters are provided to metadata storage agent 204. In step 308, metadata storage agent 204 returns to the user a search results list representative of data that (i) matches the search request, and (ii) which the user is authorized to access. An example of such a search results list is shown in FIG. 6.

In step 310, the user is presented with an option to narrow the search criteria by entry of additional parameters. If the user opts to narrow the search criteria, the additional parameters are input by the user via the Search Interface, and in step 312, the additional search parameters are provided to metadata storage agent 204. In step 314, metadata storage agent 204 returns to the user a search results list representative of data that (i) matches the narrowed search request, and (ii) which the user is authorized to access. Steps 312-314 may be repeated in order to successively narrow the search, as desired by the user.

In step 316, the user can display an item corresponding to one of the entries on the search results list (see FIG. 6) by clicking on the item via the Search Interface. In response to a user "clicking on" an item in the search results list for display, the Search Interface accesses the metadata storage agent 204 (step 318), which in turn returns the location or locations of source data (which may be from data sources 102, 104, 106, 108, 110, 112, 114 and/or 100 and/or 120,122,124) corresponding to the item selected by the user (step 320) and a display method associated with the source data (step 322) (e.g., the identify of an application required to display the data). In step 324, the Search Interface uses the data location information and the display method information to display the source data to the user. In the event that the native application used for implementing the Search Interface lacks functionality required for displaying the selected source data, an application required to view the selected search result is automatically launched by the Search Interface and used for displaying the selected source data to the user.

In step 326, the user can select an item corresponding to one of the entries on the search results list (see FIG. 6) in order to save the data to a storage medium for distribution. This media is not part of the repository, but a writable storage media attached to the user's computer or network that they have security authorization to write to. An example would be an in-house corporate counsel locating all activities of a given broker and then using this facility to prepare a CD-ROM to send to external counsel.

In step 328, the Search Interface accesses metadata agent 204 which in turn returns the location or locations of source data (which may be data sources 102, 104, 106, 108, 110, 112, 114 and/or 100 and/or 120,122,124) corresponding to the item selected by the user (step 330) and the storage method currently used for storing the source data (step 332). In step 334, the Search Interface uses the data location information and the storage method information to access the source data and then store the data on a storage medium selected by the user.

A plurality of taxonomies is provided within MetaTag Repository 212. Each of the taxonomies describes a structure of a structured database corresponding to one of the data sources (102-112). An ontology is also provided within MetaTag Repository 212, based at least in part on the taxonomies. The ontology describes data relationships between the plurality of databases associated with the enterprise (e.g., data sources 102-112). When a search request is received from the user in step 306 (or step 312), the ontology and the taxonomies are accessed and used to search the plurality of source databases associated with the enterprise.

C. Data Metamorphosis

It often happens that a current software application (available in a current version) was previously available in an old version, where the current version of the software stores data in a current data storage format and the old version of the software previously stored the data in an old data storage format which is different from the current data storage format. The software of the present invention includes 'data metamorphosis' functionality which supports usage of data stored in the old data storage format with the current version of the software. The invention includes an XML definition for each of a plurality of object classes used to store data in the old data storage format and the new data storage format, and data format rules for each XML definition. When the current version of the software recalls data in the old data storage format, at least some of the XML definitions and format rules are used to dynamically convert the data in the old storage format to the current data storage format, thereby allowing usage of the data in the old storage format by the current version of the application.

Table I below shows a sample XML definition for customer order data stored by an old version (e.g., version 1) of an ordering system software application, and Table II below shows a sample XML definition for customer order data stored by a current version (e.g., version 7) of the ordering system software application. The present invention includes a graphical user interface (shown in FIGS. 7-11) for generating the W3C organization XML definitions. These definitions in conjunction with code (format rules) are stored in MetaTag Repository 212, and provide the present invention with the ability to dynamically alter data formats during the retrieval of source data from storage locations.

TABLE I

Sample XML Definition Of A Customer Order From Version 1 Of The Ordering System

```
<xsd:schema xmlns:xsd="http://www.w3.org/2001/XMLSchema">
    <xsd:annotation>
        <xsd:documentation xml:lang="en">
            Order System Version 1
            Sample Definitiion
        </xsd:documentation>
    </xsd:annotation>
    <xsd:element name="customerOrder" type="customerOrderType"/>
    <xsd:element name="comment" type="xsd:string"/>
    <xsd:complexType name="customerOrderType">
        <xsd:sequence>
            <xsd:element name="shipTo" type="USAddress"/>
            <xsd:element name="billTo" type="USAddress"/>
            <xsd:element ref="comment" minOccurs="0"/>
            <xsd:element name="items" type="Items"/>
        </xsd:sequence>
        <xsd:attribute name="orderDate" type="xsd:date"/>
    </xsd:complexType>
    <xsd:complexType name="USAddress">
        <xsd:sequence>
            <xsd:element name="name" type="xsd:string"/>
            <xsd:element name="street" type="xsd:string"/>
            <xsd:element name="city" type="xsd:string"/>
            <xsd:element name="state" type="xsd:string"/>
            <xsd:element name="zip" type="xsd:decimal"/>
        </xsd:sequence>
        <xsd:attribute name="country" type="xsd:NMTOKEN" fixed="US"/>
    </xsd:complexType>
    <xsd:complexType name="Items">
        <xsd:sequence>
            <xsd:element name="item" minOccurs="0" maxOccurs="unbounded">
                <xsd:complexType>
                    <xsd:sequence>
                        <xsd:element name="productName" type="xsd:string"/>
                        <xsd:element name="quantity">
                            <xsd:simpleType>
                                <xsd:restrictionbase="xsd:positiveInteger">
                                    <xsd:maxExclusive value="100"/>
                                </xsd:restriction>
                            </xsd:simpleType>
                        </xsd:element>
                        <xsd:element name="USPrice" type="xsd:decimal"/>
                        <xsd:element ref="comment" minOccurs="0"/>
                        <xsd:element name="shipDate" type="xsd:date" minOccurs="0"/>
                    </xsd:sequence>
```

TABLE I-continued

Sample XML Definition Of A Customer Order From Version 1 Of The Ordering System

```
                    <xsd:attribute name="partNum" type="SKU" use="required"/>
                </xsd:complexType>
            </xsd:element>
        </xsd:sequence>
    </xsd:complexType>
    <!-- Stock Keeping Unit, a code for identifying products -->
    <xsd:simpleType name="SKU">
        <xsd:restrictionbase="xsd:string">
            <xsd:pattern value="\d{3}-[A-Z]{2}"/>
        </xsd:restriction>
    </xsd:simpleType>
</xsd:schema>
```

TABLE II

Sample XML Definition Of A Customer Order From Version 7 Of The Ordering System

```
<xsd:schema xmlns:xsd="http://www.w3.org/2001/XMLSchema">
    <xsd:annotation>
        <xsd:documentation xml:lang="en">
            Order System Version 7
            Sample Definitiion
        </xsd:documentation>
    </xsd:annotation>
    <xsd:element name="customerOrder" type="customerOrderType"/>
    <xsd:element name="comment" type="xsd:string"/>
    <xsd:complexType name="customerOrderType">
        <xsd:sequence>
            <xsd:element name="customerNumber">
                <xsd:simpleType>
                    <xsd:restriction base="xsd:positiveInteger">
                        <xsd:maxExclusive value="9999"/>
                    </xsd:restriction>
                </xsd:simpleType>
            <xsd:element ref="comment" minOccurs="0"/>
            <xsd:element name="items" type="Items"/>
        </xsd:sequence>
        <xsd:attribute name="orderDate" type="xsd:date"/>
    </xsd:complexType>
    <xsd:complexType name="Items">
        <xsd:sequence>
            <xsd:element name="item" minOccurs="0" maxOccurs="unbounded">
                <xsd:complexType>
                    <xsd:sequence>
                        <xsd:element name="productName" type="xsd:string"/>
                        <xsd:element name="quantity">
                            <xsd:simpleType>
                                <xsd:restriction base="xsd:positiveInteger">
                                    <xsd:maxExclusive value="100"/>
                                </xsd:restriction>
                            </xsd:simpleType>
                        </xsd:element>
                        <xsd:element name="USPrice" type="xsd:decimal"/>
                        <xsd:element ref="comment" minOccurs="0"/>
                        <xsd:element name="shipDate" type="xsd:date" minOccurs="0"/>
                    </xsd:sequence>
                    <xsd:attribute name="partNum" type="SKU" use="required"/>
                </xsd:complexType>
            </xsd:element>
        </xsd:sequence>
    </xsd:complexType>
    <!-- Stock Keeping Unit, a code for identifying products -->
    <xsd:simpleType name="SKU">
        <xsd:restriction base="xsd:string">
            <xsd:pattern value="\d{3}-[A-Z]{2}"/>
        </xsd:restriction>
    </xsd:simpleType>
</xsd:schema>
```

The XML schemes described in Tables I and II layout the actual database schema for the ordering system. In version 7, the schema for the database has been altered to reference a second database that contains the customer information. This requires that any access to version 1 data be converted to the new format in order to be used in the same application programs. This is accomplished by adding a method within the data definition of the schema 1 object description contained in the MetaTag Repository 212. This method is illustrated in Table III below and added based upon on XML definitions and mapping created using the graphical user interface of FIGS. 7-11.

TABLE III

```
<xsl:metamorphosis                              ; Define Data Metamorphosis
xmlns:xsl="http://www.w3.org/1999/XSL/Transform"
version="1.0">
<xsl:condition currentVersion="1", targetVersion="7"/>  ; Define Trigger Condition
<xsl:template match="results">                          ; Define Method
    <xsl:for-each select="$shipto::name">               ;Key to search customers
        <xsl:databaseQuery, customerMaster, key="name", $Select/> ; Lookup Name
        <xsl:RemoveFields>                       : Remove Ver 1 Fields
            <xsl:element name="shipTo" type="USAddress"/>
            <xsl:element name="billTo" type="USAddress"/>
        </xsl:RemoveFields>
        <xsl:ReplaceFields>                      : Add Version 7 Fields
            <xsd:element name="customerNumber" source="customerMaster::CustID>
        </xsl:ReplaceFields>
    </xsl:for-each>
</xsl:template>
</xsl:transform>
```

D. Object-Oriented Reactive Secure Collaboration

As mentioned above in connection with FIG. 3, in response to a search request, metadata storage agent 204 returns to the user a search results list representative of data that (i) matches the narrowed search request, and (ii) which the user is authorized to access. (Step 314). In one embodiment, the user's authority to access (and/or share) data is determined in the context of a collaboration environment that changes dynamically based on the occurrence of events external to the data collaboration environment. The collaboration environment is defined to include roles, activities and external event specifications. Each role defines data access privileges granted to a user during a session, each activity defines with whom the user can share data, and each external event specification defines an event external to the collaboration environment which must occur before an activity is permitted for a defined role during a session. Data sharing privileges granted to a user change dynamically in response to the occurrence of an external event identified in one of the defined external event specifications. Table IV below sets forth definitions for roles, activities and external event specifications, in accordance with specific examples of the invention.

TABLE IV

| Name | Description |
|---|---|
| Role Specification | This names the 'role' of the user being granted access to the information contained in the system. A given individual can be assigned several 'roles'. For example, an individual may be assigned the following roles: administrator, auditing, security; while another individual may simply be assigned the role: user. |
| Activity Specification | Control - Complete access to system information, including defining security for others for the information item, and all other functions<br>Read - user only to read information and not alter any.<br>Write - user may write new information, but not modify existing or read existing information<br>Modify - User may read and alter existing information, but not create new information<br>Meta - User may access only metadata for the information, but not the source information<br>Delete - User may delete information<br>Audit - Read the audit log concerning activities for the information |
| Event Specification | Defines an external 'condition' such as a Defense Department 'DEFCON' (Defense Condition). DEFCON 1 is the highest alert level (war) with DEFCON 5 being a peaceful alert level. Any 'conditions' can be defined to cover information sharing activities. For example, an event can be defined to permit military or civilian agencies that otherwise do not share data to automatically share during emergencies or other defined events/conditions. |

In a further example, the event specification of the collaboration environment is defined based on the four possible events (set forth in Table V below) and the collaboration environment set-up is shown in Table VI below.

TABLE V

| Event | Description |
|---|---|
| Normal | Information and other security per defined policy |
| Crime Alert | A crime has been committed, information sharing allowing coordination among local law official is now allowed |
| Disaster Alert | A natural event has occurred resulting in loss of life and property, Information sharing among all levels of government with limited media access is now allowed |
| Attack Alert | An attack has occurred resulting in loss of life and property, Information sharing among all levels of government with some media access is now allowed. Some other government levels also have CONTROL level access to allow enable data sharing on a as needed basis. |

TABLE VI

Example Reactive Collaboration Setup

| Role | Event Specification | Information Type | Activity Level |
|---|---|---|---|
| Administrator | Normal | Chemical Sensor Status | Control |
| | | Video Surveillance Data | Control |
| | | Personnel Status | Control |
| | | Tollbooth/Tunnel Bridge License Scans | Control |
| | | Public Announcements | Control |
| | Crime | Chemical Sensor Status | Control |
| | | Video Surveillance Data | Control |
| | | Personnel Status | Control |
| | | Tollbooth/Tunnel Bridge License Scans | Control |
| | | Public Announcements | Control |
| | Disaster | Chemical Sensor Status | Control |
| | | Video Surveillance Data | Control |
| | | Personnel Status | Control |
| | | Tollbooth/Tunnel Bridge License Scans | Control |
| | | Public Announcements | Control |
| | Attack | Chemical Sensor Status | Control |
| | | Video Surveillance Data | Control |
| | | Personnel Status | Control |
| | | Tollbooth/Tunnel Bridge License Scans | Control |
| | | Public Announcements | Control |

TABLE VI-continued

Example Reactive Collaboration Setup

| Role | Event Specification | Information Type | Activity Level |
|---|---|---|---|
| Responder Personnel | Normal | Chemical Sensor Status | Meta |
| | | Video Surveillance Data | Meta |
| | | Personnel Status | Meta |
| | | Tollbooth/Tunnel Bridge License Scans | Meta |
| | | Public Announcements | Read |
| | Crime | Chemical Sensor Status | Meta |
| | | Video Surveillance Data | Read |
| | | Personnel Status | Meta |
| | | Tollbooth/Tunnel Bridge License Scans | Read |
| | | Public Announcements | Read |
| | Disaster | Chemical Sensor Status | Meta |
| | | Video Surveillance Data | Read |
| | | Personnel Status | Read |
| | | Tollbooth/Tunnel Bridge License Scans | Read |
| | | Public Announcements | Read |
| | Attack | Chemical Sensor Status | Read |
| | | Video Surveillance Data | Read |
| | | Personnel Status | Read |
| | | Tollbooth/Tunnel Bridge License Scans | Read |
| | | Public Announcements | Read |
| Local Agency | Normal | Chemical Sensor Status | Modify, Write |
| | | Video Surveillance Data | Modify, Write |
| | | Personnel Status | Modify, Write |
| | | Tollbooth/Tunnel Bridge License Scans | Modify, Write |
| | | Public Announcements | Modify, Write |
| | Crime | Chemical Sensor Status | Modify, Write |
| | | Video Surveillance Data | Modify, Write |
| | | Personnel Status | Modify, Write |
| | | Tollbooth/Tunnel Bridge License Scans | Modify, Write |
| | | Public Announcements | Modify, Write |
| | Disaster | Chemical Sensor Status | Modify, Write |
| | | Video Surveillance Data | Modify, Write |
| | | Personnel Status | Modify, Write |
| | | Tollbooth/Tunnel Bridge License Scans | Modify, Write |
| | | Public Announcements | Modify, Write |
| | Attack | Chemical Sensor Status | Modify, Write |
| | | Video Surveillance Data | Modify, Write |
| | | Personnel Status | Modify, Write |
| | | Tollbooth/Tunnel Bridge License Scans | Modify, Write |
| | | Public Announcements | Modify, Write |
| Other Agency | Normal | Chemical Sensor Status | None |
| | | Video Surveillance Data | None |
| | | Personnel Status | None |
| | | Tollbooth/Tunnel Bridge License Scans | None |
| | | Public Announcements | Read |
| | Crime | Chemical Sensor Status | None |
| | | Video Surveillance Data | Read |
| | | Personnel Status | None |
| | | Tollbooth/Tunnel Bridge License Scans | Read |
| | | Public Announcements | Read |
| | Disaster | Chemical Sensor Status | Read |
| | | Video Surveillance Data | Read |
| | | Personnel Status | Read |
| | | Tollbooth/Tunnel Bridge License Scans | Read |
| | | Public Announcements | Read |
| | Attack | Chemical Sensor Status | Control |
| | | Video Surveillance Data | Control |
| | | Personnel Status | Control |
| | | Tollbooth/Tunnel Bridge License Scans | Control |
| | | Public Announcements | Control |
| News Media | Normal | Chemical Sensor Status | None |
| | | Video Surveillance Data | None |
| | | Personnel Status | None |
| | | Tollbooth/Tunnel Bridge License Scans | None |
| | | Public Announcements | Read |
| | Crime | Chemical Sensor Status | None |
| | | Video Surveillance Data | None |
| | | Personnel Status | None |
| | | Tollbooth/Tunnel Bridge License Scans | None |
| | | Public Announcements | Read |
| | Disaster | Chemical Sensor Status | None |
| | | Video Surveillance Data | None |
| | | Personnel Status | None |
| | | Tollbooth/Tunnel Bridge License Scans | None |
| | | Public Announcements | Read |
| | Attack | Chemical Sensor Status | None |
| | | Video Surveillance Data | None |
| | | Personnel Status | None |
| | | Tollbooth/Tunnel Bridge License Scans | None |
| | | Public Announcements | Read |

E. Data Collector Agent

Figure 13:
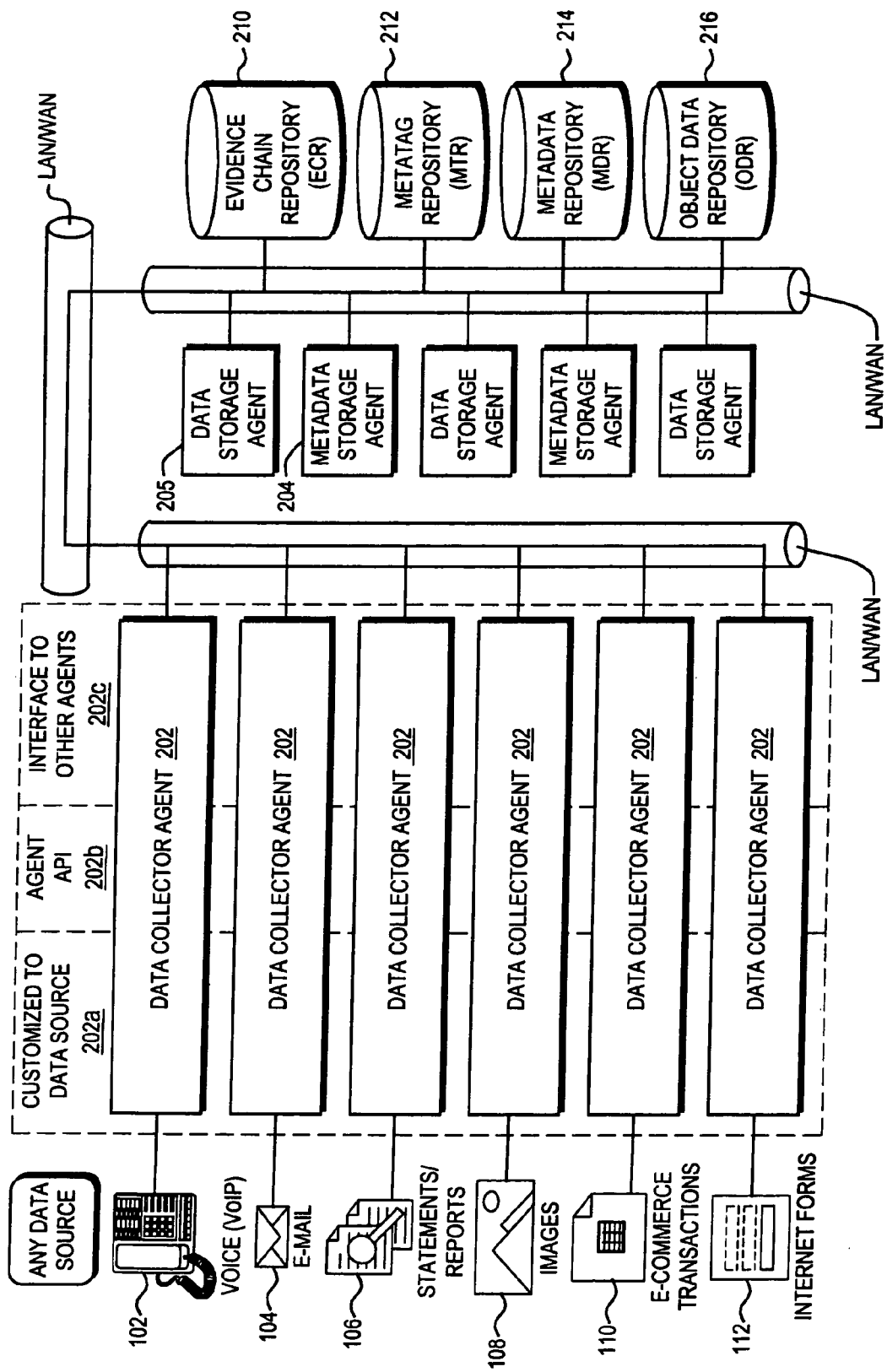
FIG. 13 is a block diagram showing the components of a data collector agent of the present invention.

Referring now to FIG. 13, a block diagram is shown illustrating the components of a data collector agent 202 of the present invention. Each data collector agent 202 includes a first portion 202*a* which is customized to the data source associated with the agent; an agent API portion 202*b*, and an interface portion 202*c* for interfacing with other agents.

Figure 14A:
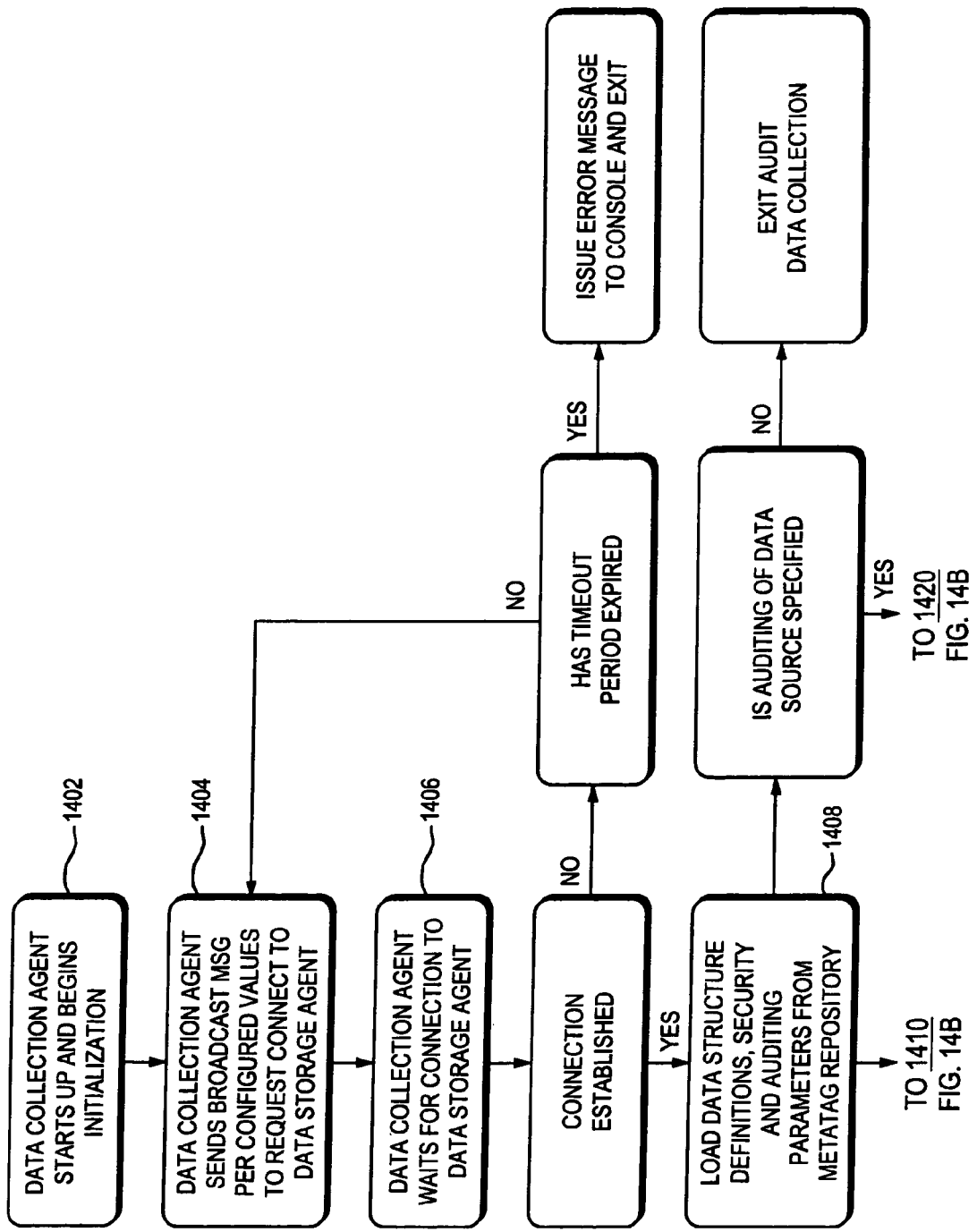
FIG. 14 is a flow diagram illustrating steps performed by the data collector agent of the present invention.
Figure 14B:
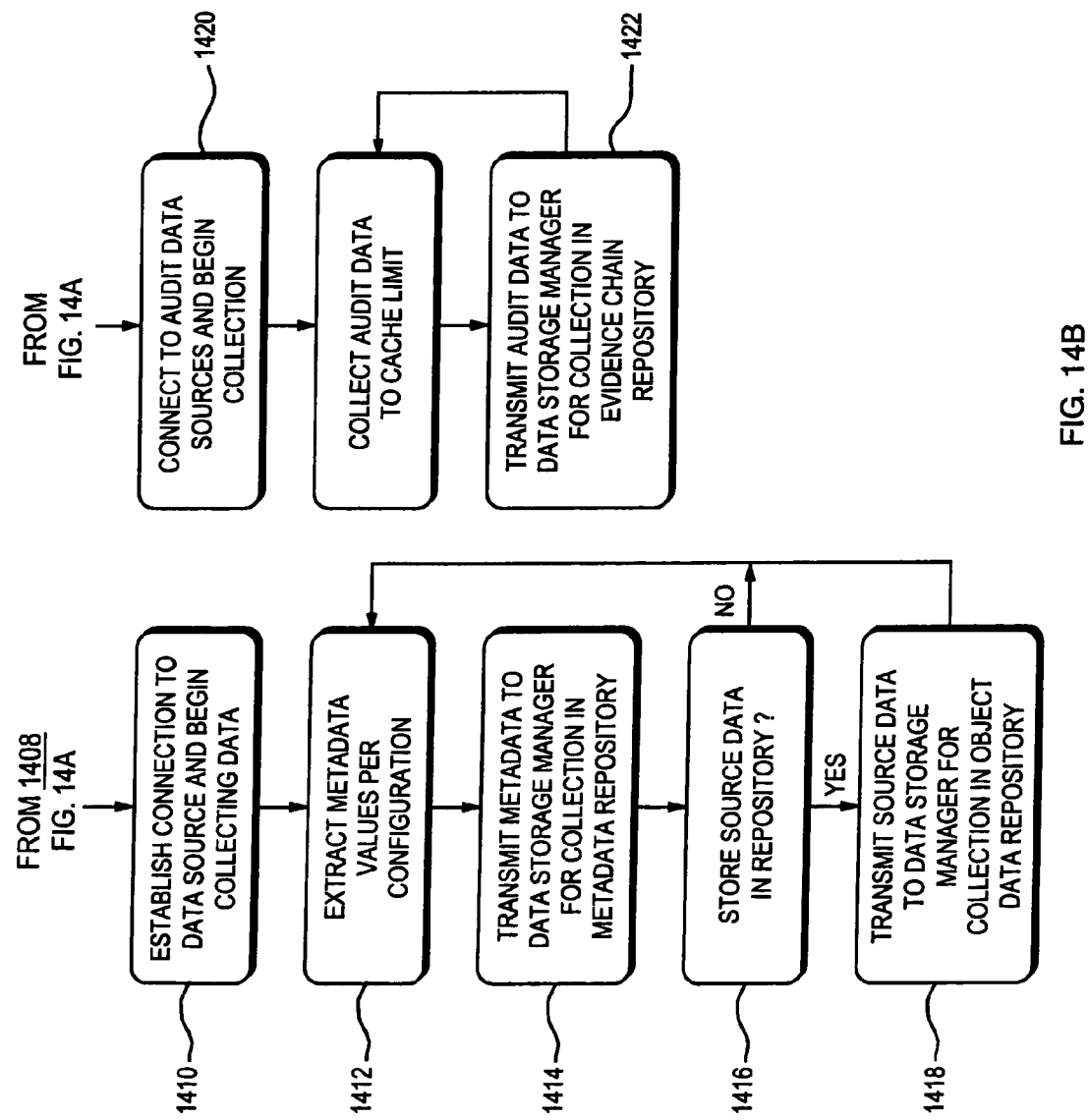

Referring now to FIG. 14, a flow diagram is shown illustrating steps performed by the data collector agent 202. In step 1402, the agent starts-up and begins initialization. In step 1404, data collection agent 202 sends a broadcast message to request a connection to a data storage agent 205 and, in step 1406 data collector agent waits for a connection with data storage agent 205. The storage agent virtualizes the storage destinations for the system. The storage agent uses the MetaTag Repository, as the source for its configuration and management. The storage agent stores and retrieves data to and from the Object Data Repository and OCR. This component provides reliability and scalability to the data storage function of the invention by recovering from communications outages, network-partitioning events, and server crashes using rules defined in the MetaTag Repository. The metadata agent manages the MetaData Repository via the information in the MetaTag Repository. The metadata agent maintains the integrity of the metadata structure and ensures the 'freshness' of the metadata at all levels of the hierarchy.

Referring again to FIG. 14, once the connection is established between the data collector agent and the data storage agent 205, data structure definitions, security and auditing parameters (corresponding to the data source associated with the data collector agent 202) are retrieved from MetaTag repository 212 (step 1408). In step 1410, data collector agent 202 establishes a connection to the data source associated with the agent (e.g., source 102), and in step 1412 extracts metadata values which may include, without limitation, major indicies of databases, word dictionaries for unstructured data, or time code annotations for video streams from the data source associated with agent 202. In step 1414, the agent 202 transmits the collected metadata values to a data storage manager for collection in MetaData repository 214. If the user has requested storage of source data in repository 100 (step 1416), then agent 202 transmits source data (from the data source associated with agent 202) to a data storage manager for collection in object data repository 216. If auditing of the source associated with agent 202 has been specified, then in steps 1420 and 1422, the agent 202 collects auditing data from the data source associated with agent 202, and transmits the audit data to a data storage manager for collection in evidence chain repository 220. In one embodiment of steps 1420 and 1422, agent 202 and evidence chain repository 220 log various events that occur with respect to the application associated with the data source such as, e.g., server status, server operations performed, and network status, application changes, stops and starts, when data is accessed, by who, when and what operations was attempted. The evidence chain repository also collects information from the data storage agents 204 when information is accessed within the repository 100. This includes the type of access (read, write, etc.), who accessed and the time.

FIG. 15 is a block diagram illustrating the object transmission format used by the data collector agent 202 for transmitting information to the data storage and metadata agents 204.

F. Improving Data Availability by Fragmenting Data Across Network Nodes

In one embodiment, availability of a data object is improved in the present invention using a fragmented networked storage method that exploits the statistical stability of a large number of storage points. The concept improves retrievability of a data object over simple replication and is applicable to networks where nodes enter and exit the network in a manner that is unpredictable. In this storage method, the number of segments to break a data object into is specified. Thus, if two fragments (backups) are specified and 32 replicates exist for each fragment, this would correspond to a 2-times storage overhead.

Possible availability of data object is computed in accordance with the equation below:

$$P_Q = \sum_{i=0}^{n-m} \frac{\binom{M}{i}\binom{N-M}{n-i}}{\binom{N}{n}}$$

where, $P_Q$ is the probability that a given Data Object will be available, n is the total number of data fragments, m is the minimum count of data fragments needed to reconstruct the data object, N is the total number of network storage positions (network nodes with storage and storage agents 204), and M is the count of networked storage positions unavailable.

The probability that a given data object will be available (retrievable) is equal to the number of ways that unavailable fragments can be arranged on unreachable networked storage positions multiplied by the number of ways in which available fragments can be arranged on reachable networked storage points, divided by the total number of ways all fragments can be stored on all networked storage positions. Using this method of fragmented storage, 2 simple replicated copies yield an availability probability of 99%, while 2 fragments stored via 32 sub-fragments yield an availability probability of 99.99998%.

Figure 16:
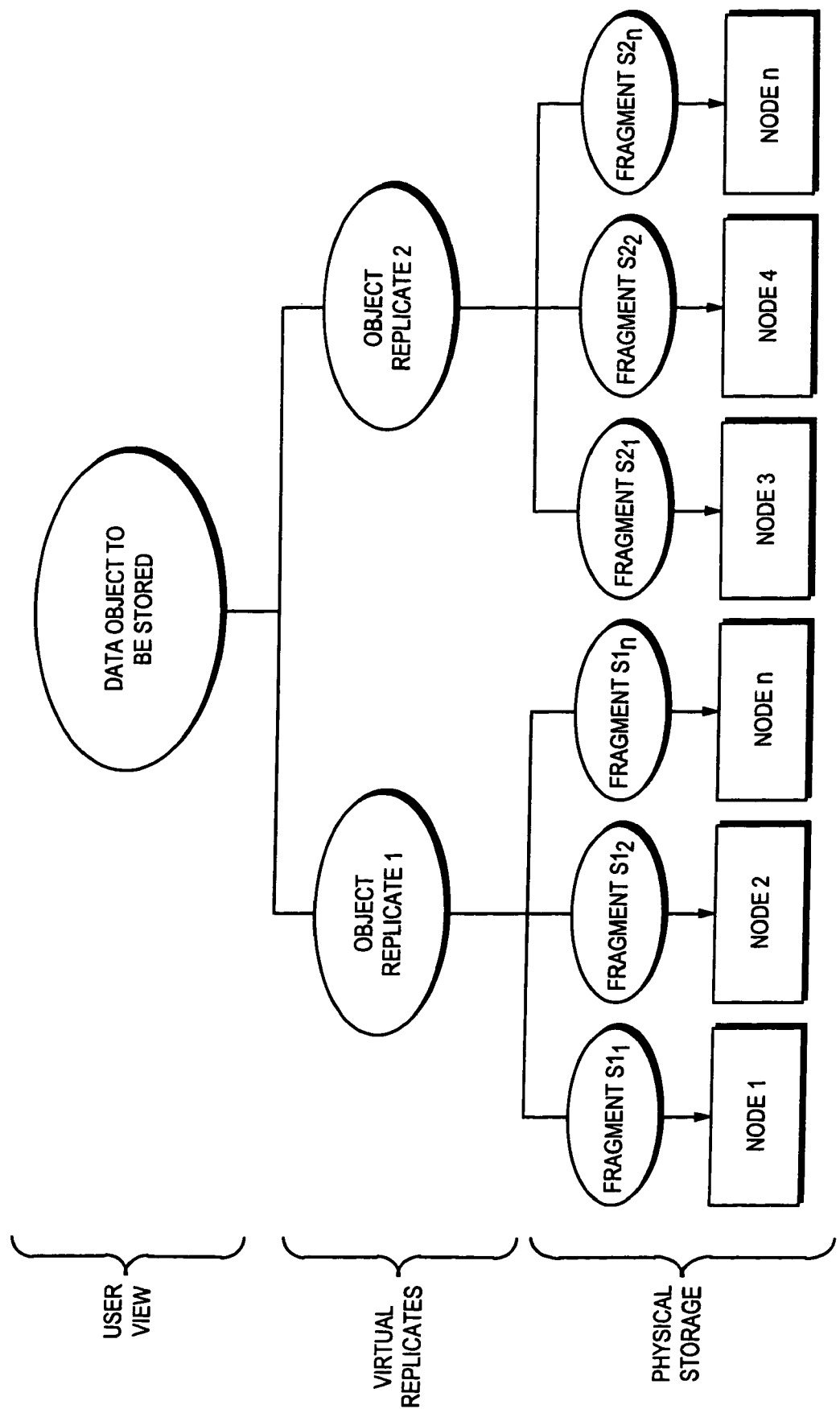
FIG. 16 is a flow diagram illustrating steps performed for fragmenting data in order to improve availability in accordance with the present invention.

Using the distributed nature of the agents described above, implementation of this fragmentation method becomes possible. Each data storage agent 205 of the network becomes a possible storage point (or node) of one of the fragments of the data object that must be stored in a highly reliable fashion and secure. Security of the data is increased since only a fragment of the total information piece is stored at any given location. This creates a virtual 'data shredder' that is reversible. FIG. 16 illustrates steps performed for fragmenting data in order to improve availability in accordance with the present invention.

The MetaTag Repository 212 for an object class has fields that denote the number of replicates and fragments for each replicated piece. The data manager agent 206 then handles the distribution of the data object across the nodes required to meet the specifications. Each fragment is assigned a unique identification which is held in MetaData repository 214. The metadata repository 214 is replicated in multiple locations to assure its availability. The original data object is not deleted until verification of that data is stored according to specified requirements of the object class for replication and fragmentation. The fragmented object store object header (shown in FIG. 17) is structured similar to the transmission object of the agent system. As shown in FIG. 17, each fragment of data includes a header with control information that specifies how the fragment connects with other fragments stored in the network. The Source Data Unique Identifier in combination with the Replicate ID and the Fragment ID creates a unique identifier for each fragmented piece of the data object (FIG. 16). For a given data object, the MetaTag Repository 212 specifies the number of replicates (RC-replicate count) and the number of fragments for each replicate (FC-fragment count). To recreate the entire data object a collection of the fragments must be accessed via the data storage agents 204. A complete data object requires all fragments 1 to FC of any replicate 1 to RC matching the Source Data Unique Identifier.

The object can be reassembled from the fragments if the metadata repository 214 is destroyed or unavailable by scanning each object data repository 216 instance and reading the header replicate/fragment IDs. A complete metadata entry can be constructed to read the entire data object once sufficient nodes have scanned their object data repositories 216. The process is reversible even with deliberate tampering by destruction of the metadata indices which point to the data locations.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

APPENDIX A

ACT! (4.02-6)
ADO
Adobe Acrobat (PDF)
ANSI Text
ASCII Source Code
ASCII Text
ASCII Transcript
AutoCAD
BDE
Btrieve
Comma Separated Values (CSV)
Compuserve E-mail
dBASE (III, IV)

DisplayWrite (4, 5)
Eudora
Excel (2.0-2000, XP, 2003)
Firefox
Flash
FoxPro (2, 2.5)
Framework 3
FTP
HTML Raw Codes
HTML Text Only
HTTP
IBM DCA/RFT
IBM DB2
IBM FFT
IFilters
Informix
Interbase
JPEG EXIF
Lotus 123 (3, 4, 5 96, 97)
Lotus Ami Pro
Lotus cc:Mail
Lotus Manuscript
Lotus Notes
Lotus WordPro (2.0, 3.0, 97)
MASS-11PC
Microsoft Access (2000, XP, 2003)
Microsoft Binders
Microsoft EML
Microsoft Excel (2.0-5.0, 95, 97, 2000, XP, 2003)
Microsoft Exchange
Microsoft Internet Explorer cache
Microsoft Internet Mail
Microsoft HTML Help (CHM)
Microsoft MHT
Microsoft MSG
Microsoft Outlook (97, 98, 2000, XP, 2003)
Microsoft Outlook Express (4, 5, 6)
Microsoft PowerPoint (4.0, 95, 97, 2000, XP, 2003)
Microsoft Personal Folders
Microsoft Public Folders
Microsoft RTF (Rich Text Format)
Microsoft SQL Server
Microsoft Visio
Microsoft Word DOS (2.0-5.5)
Microsoft Word (2.0-6.0, 95, 97, 2000, XP, 2003)
Microsoft Wordpad
Microsoft Works (1.0, 2.0, 3.0, 4.0)
Mozilla
MP3
Multimate (3.0, 4.0, 5.0, Advantage)
My SQL
Netscape Mail
ODBC
Open Access II
OpenOffice
Oracle
Paradox (3.x, 4.x, 2000)
Professional Write
Public MAPI
Q&A Write
Revelation
Sendmail mailbox
SGML Text Only
Spreadsheets
SQL
StarOffice
Sybase
Thunderbird
TIFF
Uniplex
vCard
Ventura publisher mark-up
VIM
Wang IWP
Wang WP PLUS
Windows Write (1.0, 2.0, 3.0)
Word Perfect 4.2, 5.0, 6, 7, 8, 10, 2000)
Wordstar (3, 4, 5, 6, 2000)
XML
XYWrite
ZIP files

What is claimed is:

1. A method for obtaining information responsive to a legal discovery request directed at an enterprise, wherein the legal discovery request is selected from the group consisting of a document subpoena directed to the enterprise or a request for production of documents served on the enterprise in litigation, wherein a plurality of databases is associated with the enterprise and potentially include information responsive to the legal discovery request, said plurality of databases including a plurality of structured databases and at least one unstructured database, said method comprising:
(a) providing a plurality of taxonomies, each of which describes a structure of one of the structured databases;
(b) providing an ontology, based at least in part on the taxonomies, that describes data relationships between the plurality of databases associated with the enterprise;
(c) identifying a native application that is configured to access at least one but not all of the plurality of databases associated with the enterprise;
(d) modifying the native application to include search functionality for accessing all of the plurality of databases associated with the enterprise;
(e) receiving from a user, via the modified native application, a request to search the plurality of databases associated with the enterprise for information responsive to the legal discovery request;
(f) using information included in the request, the ontology and the taxonomies to search the plurality of databases associated with the enterprise;
(g) presenting a list of search results responsive to the search request to the user with the modified native application; and
(h) in response to a user selection of a search result from the list, automatically launching an application required to view the selected search result if the modified native application lacks functionality required to display the selected search result.

2. A system for obtaining information responsive to a legal discovery request directed at an enterprise, wherein the legal discovery request is selected from the group consisting of a document subpoena directed to the enterprise or a request for production of documents served on the enterprise in litigation, wherein a plurality of databases is associated with the enterprise and potentially include information responsive to the legal discovery request, said plurality of databases including a plurality of structured databases and at least one unstructured database, said system comprising:
a server;
a data repository;
a plurality of taxonomies stored in the data repository, each taxonomy describing a structure of one of the structured databases;

an ontology stored in the data repository, based at least in part on the taxonomies, that describes data relationships between the plurality of databases associated with the enterprise;

a native application that includes a modification that adds functionality for accessing all of the plurality of databases associated with the enterprise; wherein the modification includes a user interface for receiving a user request to search the plurality of databases associated with the enterprise for information responsive to the legal discovery request; and a data collector agent capable of accessing the data repository, wherein the data collector agent uses information included in the request, the ontology stored in the data repository and the taxonomies stored in the data repository to search the plurality of databases associated with the enterprise and generate a list of search results responsive to the search request for presentation to the user via the modified native application;

wherein the modification to the native application automatically launches an application required to view a selected search result if the modified native application lacks functionality required to display the selected search result.

3. A computer program product stored in a computer readable storage medium containing computer-executable instructions that, when executed by a computer, cause the computer to perform a method for obtaining information responsive to a legal discovery request directed at an enterprise, wherein the legal discovery request is selected from the group consisting of a document subpoena directed to the enterprise or a request for production of documents served on the enterprise in litigation, wherein a plurality of databases is associated with the enterprise and potentially include information responsive to the legal discovery request, said plurality of databases including a plurality of structured databases and at least one unstructured database, said method comprising:

(a) providing a plurality of taxonomies, each of which describes a structure of one of the structured databases;

(b) providing an ontology, based at least in part on the taxonomies, that describes data relationships between the plurality of databases associated with the enterprise;

(c) identifying a native application that is configured to access at least one but not all of the plurality of databases associated with the enterprise;

(d) modifying the native application to include search functionality for accessing all of the plurality of databases associated with the enterprise;

(e) receiving from a user, via the modified native application, a request to search the plurality of databases associated with the enterprise for information responsive to the legal discovery request;

(f) using information included in the request, the ontology and the taxonomies to search the plurality of databases associated with the enterprise;

(g) presenting a list of search results responsive to the search request to the user with the modified native application; and (h) in response to a user selection of a search result from the list, automatically launching an application required to view the selected search result if the modified native application lacks functionality required to display the selected search result.

\* \* \* \* \*

UNITED STATES PATENT AND TRADEMARK OFFICE
CERTIFICATE OF CORRECTION

| | | |
|---|---|---|
| PATENT NO. | : 8,112,453 B2 | |
| APPLICATION NO. | : 12/322534 | |
| DATED | : February 7, 2012 | |
| INVENTOR(S) | : David J. Falkenberg | |

It is certified that error appears in the above-identified patent and that said Letters Patent is hereby corrected as shown below:

At column 1, line number 10, Delete: "the contents of which are incorporated herein in their entirety by reference,"

At column 1, line number 12, Replace "119(3)" with --119(e)--

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,112,453 B2 | Page 1 of 1 |
| APPLICATION NO. | : 12/322534 | |
| DATED | : February 7, 2012 | |
| INVENTOR(S) | : Falkenberg | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 66 days.

Signed and Sealed this
Nineteenth Day of June, 2012

David J. Kappos
*Director of the United States Patent and Trademark Office*